US009298342B2

(12) United States Patent
Zhang et al.

(10) Patent No.: US 9,298,342 B2
(45) Date of Patent: Mar. 29, 2016

(54) CLASSES OF MEETING PARTICIPANT INTERACTION

(71) Applicant: Cisco Technology, Inc., San Jose, CA (US)

(72) Inventors: Yajun Zhang, Shanghai (CN); Yi You, Shanghai (CN); Zhongping Zhu, Shanghai (CN); Susie Wee, Palo Alto, CA (US); Qibin Sun, Singapore (SG)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 14/052,665

(22) Filed: Oct. 11, 2013

(65) Prior Publication Data
US 2015/0085058 A1 Mar. 26, 2015

(30) Foreign Application Priority Data
Sep. 20, 2013 (CN) .......................... 2013 1 0431971

(51) Int. Cl.
*H04N 7/14* (2006.01)
*G06F 3/0481* (2013.01)
*H04L 29/06* (2006.01)
*G06F 3/0486* (2013.01)
*H04N 7/15* (2006.01)

(52) U.S. Cl.
CPC ............ *G06F 3/0481* (2013.01); *G06F 3/0486* (2013.01); *H04L 65/403* (2013.01); *H04L 65/4038* (2013.01); *H04N 7/142* (2013.01); *H04N 7/152* (2013.01)

(58) Field of Classification Search
None
See application file for complete search history.

(56) References Cited

U.S. PATENT DOCUMENTS

| 5,767,897 A | 6/1998 | Howell |
| 8,358,327 B2 | 1/2013 | Duddy |
| 2006/0164552 A1 | 7/2006 | Cutler |
| 2007/0139626 A1 | 6/2007 | Saleh et al. |
| 2010/0073454 A1* | 3/2010 | Lovhaugen ........... G06F 3/0486 348/14.03 |
| 2012/0296957 A1 | 11/2012 | Stinson et al. |
| 2012/0306993 A1 | 12/2012 | Sellers-Blais |
| 2013/0038675 A1 | 2/2013 | Malik |
| 2013/0091205 A1* | 4/2013 | Kotler ................. H04L 65/4015 709/204 |
| 2013/0091440 A1 | 4/2013 | Kotler et al. |
| 2014/0028781 A1* | 1/2014 | MacDonald ........... G06Q 10/10 348/14.07 |

OTHER PUBLICATIONS

Averusa, "Interactive Video Conferencing K-12 applications", "Interactive Video Conferencing K-12 applications" copyright 2012. http://www.averusa.com/education/downloads/hvc_brochure_goved.pdf (last accessed Oct. 11, 2013).

(Continued)

*Primary Examiner* — Maria El-Zoobi
(74) *Attorney, Agent, or Firm* — Novak Druce Conolly Bove + Quigg LLP

(57) ABSTRACT

A technology for interacting with a collaborative videoconferencing environment is disclosed. A display having a substantially "L-shaped" configuration allows for display of collaborative materials and video of remote participants simultaneously, which provides for a more natural interaction for a meeting participant interacting with the collaborative materials. Meeting participants in the collaborative videoconferencing environment can be classified based on position with respect to the environment, or their likely interaction profile. The technology can configure a meeting experience based on the classification of the meeting participant.

20 Claims, 22 Drawing Sheets

(56) References Cited

OTHER PUBLICATIONS

Clarke, Brant, "Polycom Announces RealPresence Group Series", "Polycom Announces RealPresence Group Series" dated Oct. 8, 2012 available at http://www.323.tv/news/polycom-realpresence-group-series (last accessed Oct. 11, 2013).

Cole, Camille et al., "Videoconferencing for K-12 Classrooms, Second Edition (excerpt)", Cole, C. "Videoconferencing for K-12 Classrooms, Second Edition" (excerpt) http://www.iste.org/docs/excerpts/VIDCO2-excerpt.pdf (last accessed Oct. 11, 2013), 2009.

Epson,, "BrightLink Pro Projector", BrightLink Pro Projector. http://www.epson.com/cgi-bin/Store/jsp/Landing/brightlink-pro-interactive-projectors.do?ref=van_brightlink-pro—dated 2013 (last accessed Oct. 11, 2013).

Infocus, "Mondopad", Mondopad. http://www.infocus.com/sites/default/files/InFocus-Mondopad-INF5520a-INF7021-Datasheet-EN.pdf (last accessed Oct. 11, 2013), 2013.

Mullins, Robert, "Polycom Adds Tablet Videoconferencing", Mullins, R. "Polycom Adds Tablet Videoconferencing" available at http://www.informationweek.com/telecom/unified-communications/polycom-adds-tablet-videoconferencing/231900680—dated Oct. 12, 2011 (last accessed Oct. 11, 2013).

Nu-Star Technologies, "Interactive Whiteboard Conferencing", Interactive Whiteboard Conferencing. http://www.nu-star.com/interactive-conf.php dated 2013 (last accessed Oct. 11, 2013).

Polycom, "Polycom RealPresence Mobile: Mobile Telepresence & Video Conferencing", http://www.polycom.com/products-services/hd-telepresence-video-conferencing/realpresence-mobile.html#stab1 (last accessed Oct. 11, 2013), 2013.

Polycom, "Polycom Turns Video Display Screens into Virtual Whiteboards with First Integrated Whiteboard Solution for Video Collaboration", Polycom Turns Video Display Screens into Virtual Whiteboards with First Integrated Whiteboard Solution for Video Collaboration—http://www.polycom.com/company/news/press-releases/2011/20111027_2.html_dated Oct. 27, 2011.

"VidyoPanorama", VidyoPanorama—http://www.vidyo.com/products/vidyopanorama/ dated 2013 (last accessed Oct. 11, 2013).

John MacCormick, "Video Chat with Multiple Cameras," CSCW '13, Proceedings of the 2013 conference on Computer supported cooperative work companion, pp. 195-198, ACM, New York, NY, USA, 2013.

Polycom, "Polycom UC Board Specifications," 2012, Polycom, Inc.,, San Jose, CA, http://www.uatg.com/pdf/polycom/polycom-uc-board-datasheet.pdf, (last accessed Oct. 11, 2013).

* cited by examiner

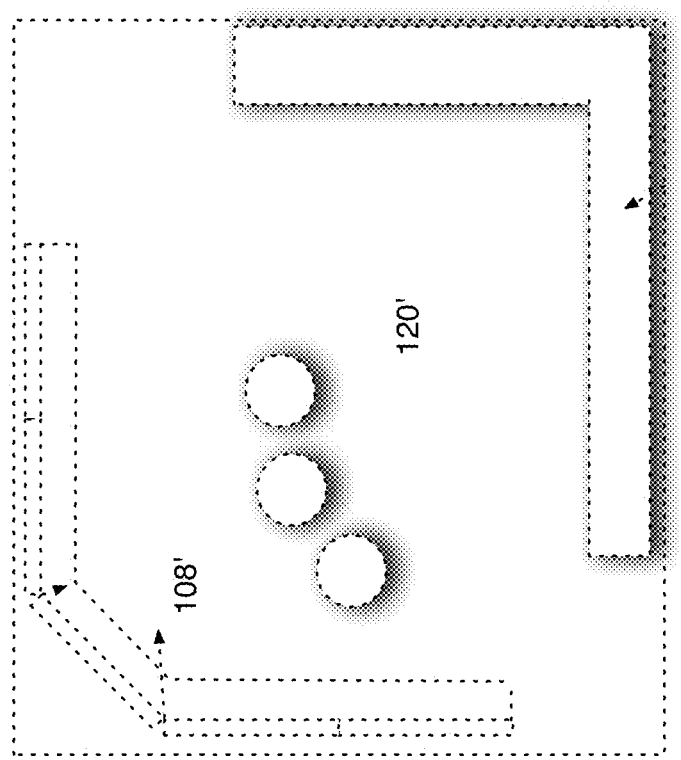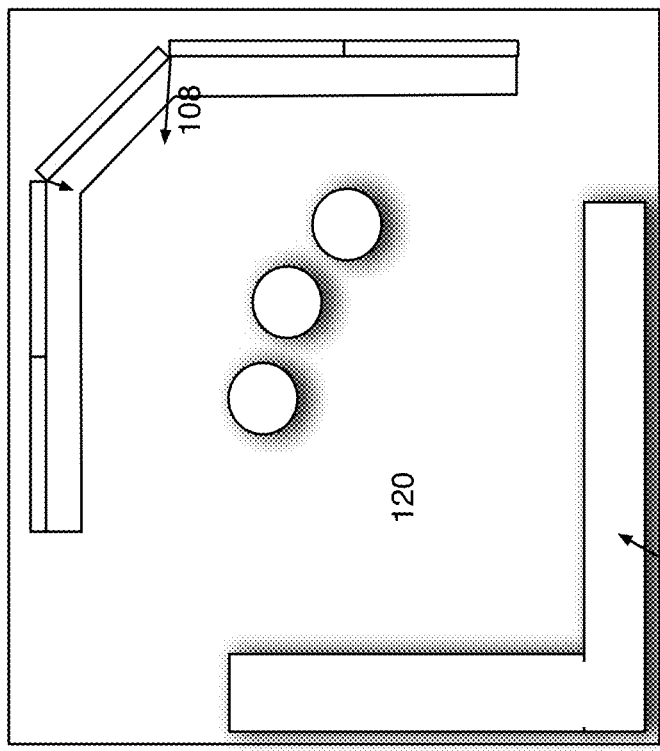
FIG. 2

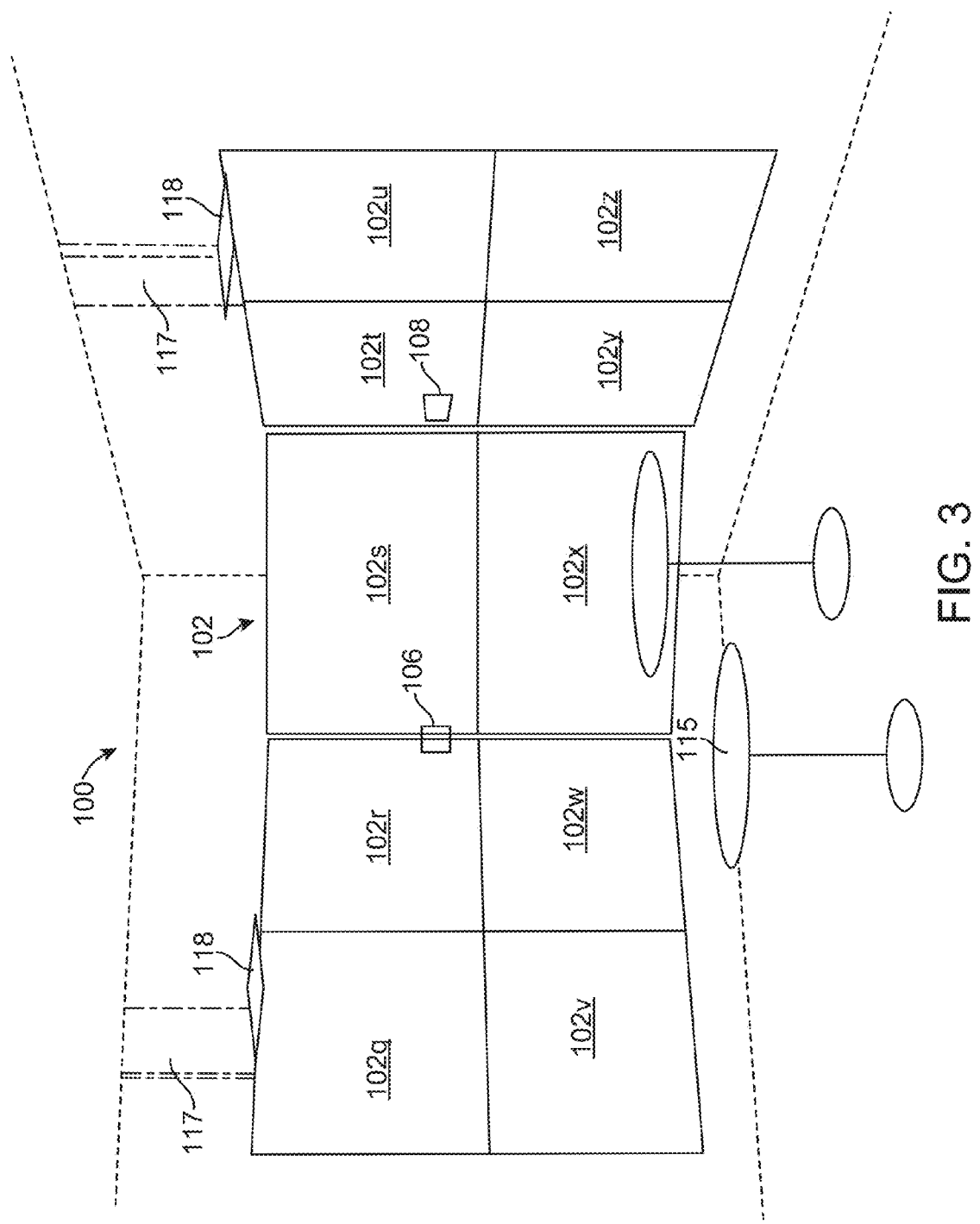

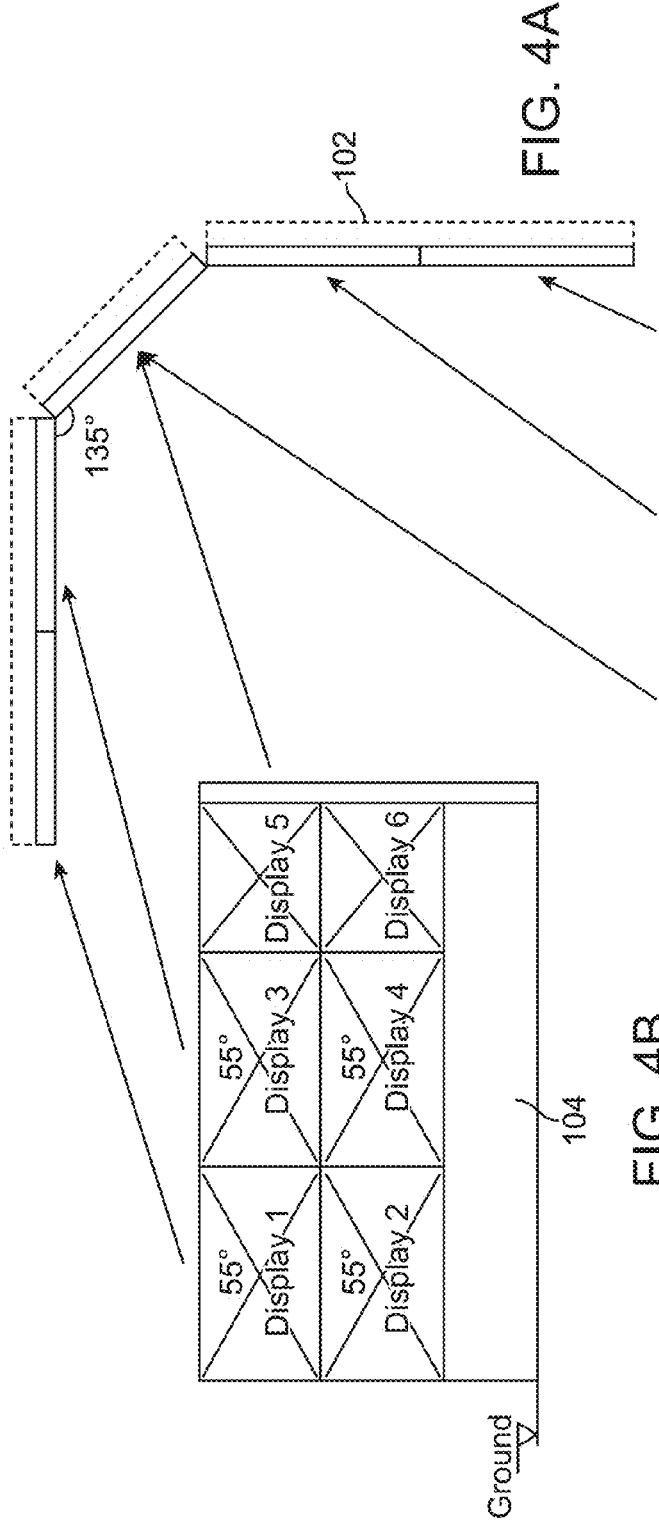

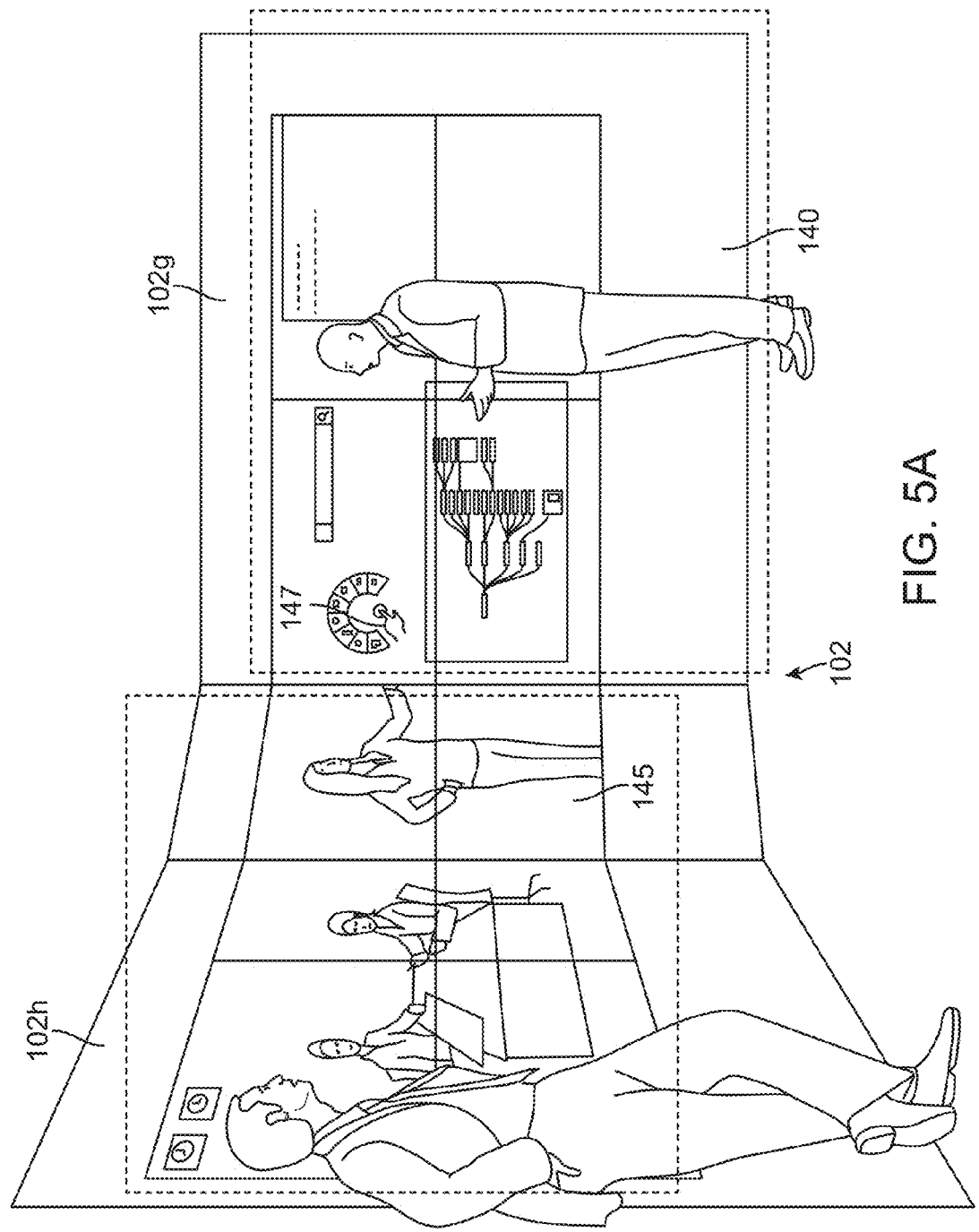

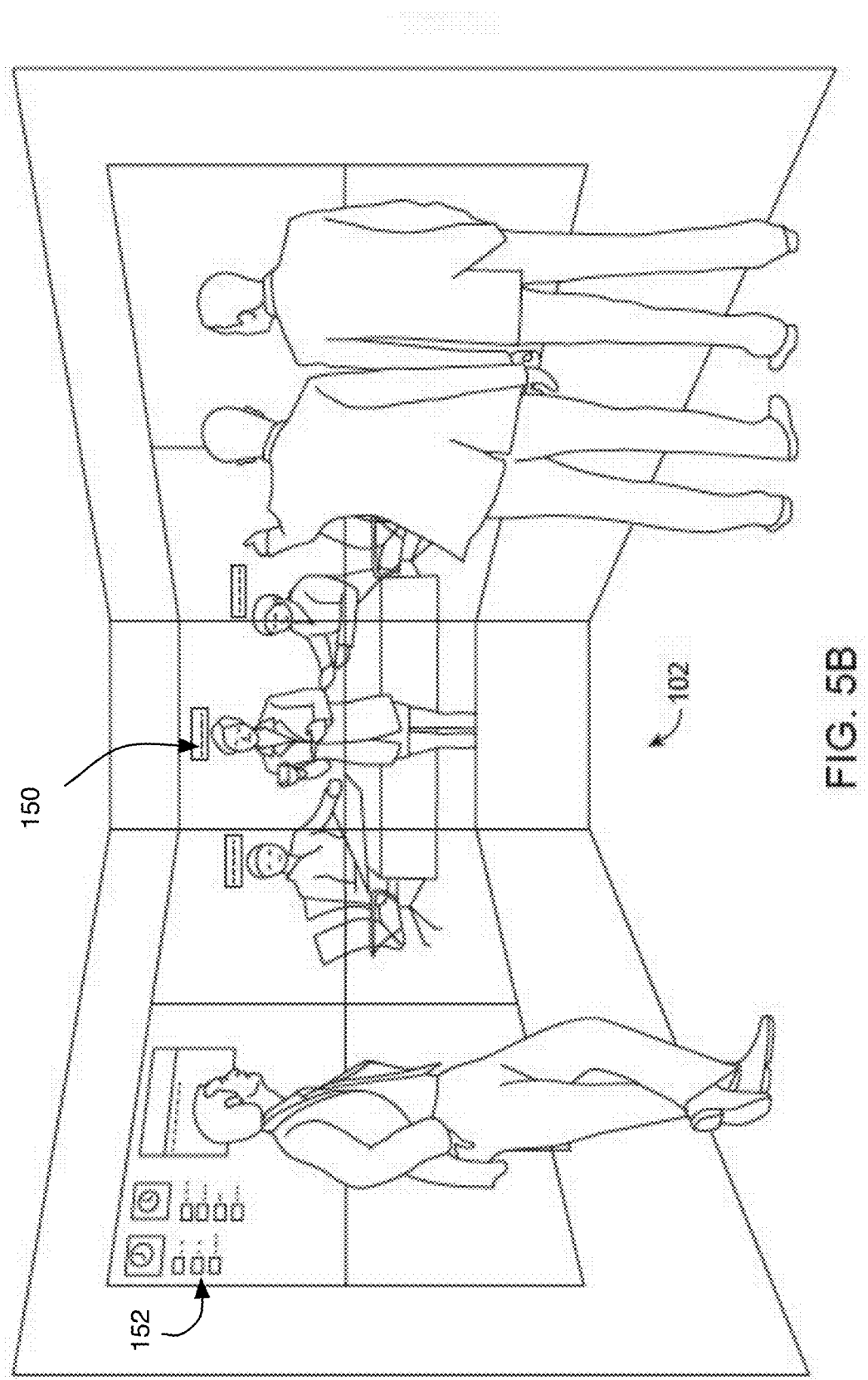

CLASSES OF MEETING PARTICIPANT INTERACTION

CROSS-REFERENCE TO RELATED APPLICATIONS

This application claims priority to Chinese Application No. 201310431971.7, filed Sep. 22, 2013, titled, "IMMERSIVE AND INTERACTIVE VIDEOCONFERENCE ROOM ENVIRONMENT", which is incorporated by reference herein in its entirety.

TECHNICAL FIELD

The present disclosure is related generally to collaborative meeting systems such as videoconference systems and content collaboration systems, and more specifically pertains to treating meeting participants according to assigned classes of interaction with such systems.

BACKGROUND

Advancements in videoconferencing technology have begun to pay dividends and, for some meetings, videoconferencing has provided a reasonable substitute for in person meetings. State-of-the-art videoconferencing systems provide dedicated cameras and monitors to one or two or more users, utilize innovative room arrangements to make the remote participants feel like they are in the same room by placing monitors and speakers at locations where a remote meeting participant would be sitting, if they were attending in person. Such systems better achieve a face-to-face communication paradigm wherein meeting participants can view facial expressions and body language that can't be achieved in a teleconference. Some of these systems allow content, applications, or computer screens to be shared. However, often times, such systems are lacking with respect to more collaborative meetings wherein two or more members might want to work together on a white board, or even simultaneously view a presentation and a speaker.

Even more recently, there have been advancements in collaborative systems wherein two or more users can remotely work on the same workspace, such as an electronic board that can function as a white-board and video monitor all in one. Such systems improve the ability of collaborators to work in a shared space, but have poor user engagement features. At best, these systems might allow for small video images of the remote users to be displayed on the electronic board while the rest of the board is reserved for collaboration space.

In an attempt to achieve the best aspects of both collaboration systems and videoconferencing technology, sometimes both of these systems will be deployed side-by-side. However, this approach leaves a lot to be desired as the two systems are not integrated, and neither technology is configured to account for the presence of the other technology in a seamlessly integrated manner.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates exemplary local and remote interactive videoconference room environments;

FIG. 3 illustrates an exemplary in-room-perspective view of the interactive videoconference room environment;

FIGS. 4A-4C illustrate exemplary details of one embodiment of display arrangement of the interactive videoconference room environment;

FIG. 5A and FIG. 5B illustrate two exemplary system modes;

DESCRIPTION OF EXAMPLE EMBODIMENTS

Overview

Figure 1:
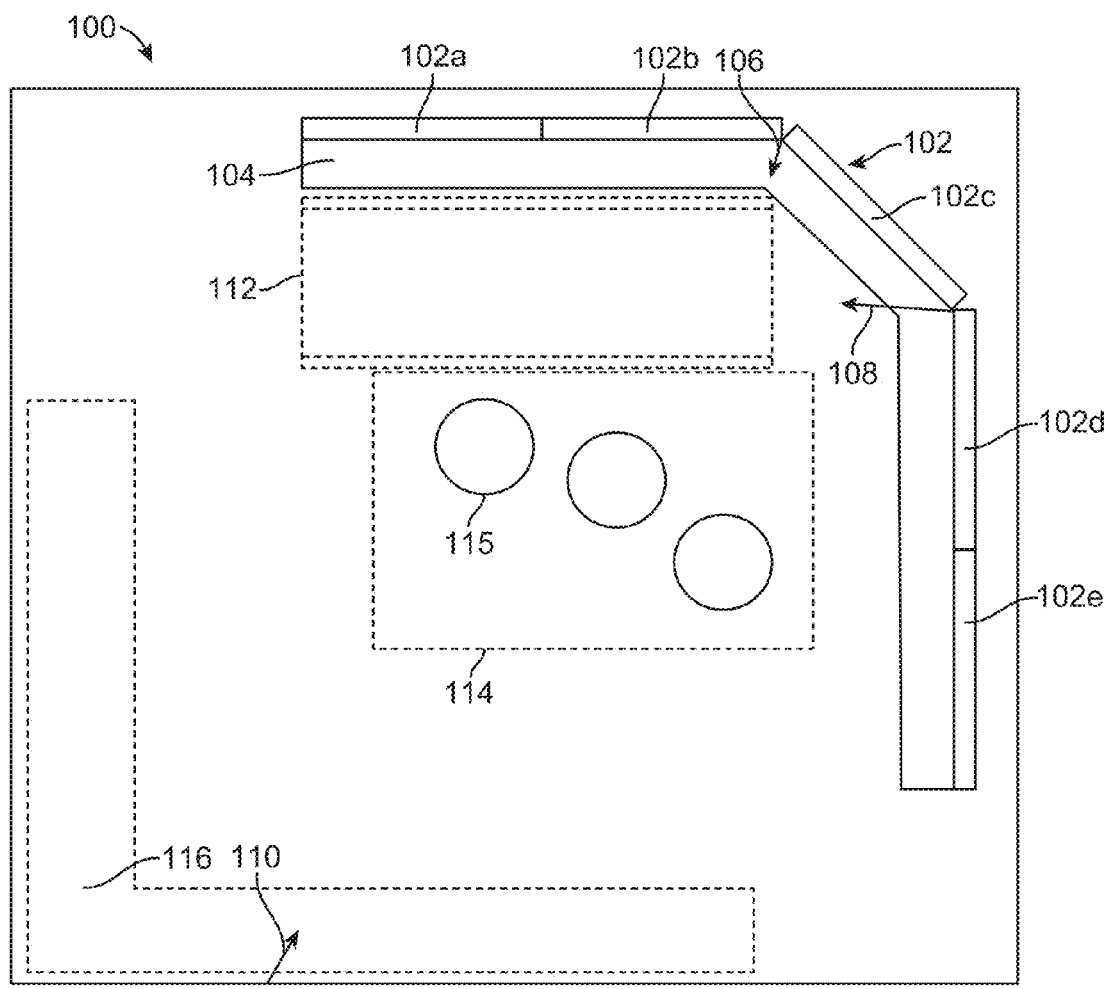
FIG. 1 illustrates an exemplary top view of a layout of an immersive and interactive videoconference room environment.

Disclosed are systems, methods, devices, and non-transitory computer-readable storage media related to collaborative meeting systems and in particular an immersive and interactive collaborative meeting system room environment.

Collaborative meetings with remote participants are becoming more popular. This requires today's videoconference system to present users (local users) not only the video of remote participants but also the meeting materials (usually electronic documents).

Most existing videoconference systems are very restrictive. They require participants to sit in predefined seats at all time. When users need to present electronic documents in the meeting, the systems usually displays the video of remote participants and the electronic document in two separate areas.

However, the separation between video of remote participants and electronic documents cause several problems in the collaborative meetings. These problems will discount the overall experience of remote collaboration. For example these systems fail to support different types of meetings. Due to constraints of camera setting, most existing videoconference systems are designed to support only sitting scenarios. When users stand up, their heads will no longer be displayed in the video. As an additional example, existing systems fail to display interactions between remote participants and an electronic document. When people have collaborative meetings in the same location, they can see each interaction between the document material and other meeting participants e.g. where other participants point on the document, where they start doing editing, etc.

The present technology improves the collaborative videoconference experience by providing a system that accommodates videoconference meetings with and without electronic material by providing a dividable display that is dividable into a collaboration section and a video section. The dividable display is made up of a plurality of panels integrated to perform as one display device. The panels are arranged in an angular configuration to provide a somewhat wrap around or "L-shaped" or concave configuration. When there is no electronic material to display, this wrap-around system can be used solely for videoconferencing with a panoramic view of the video from the remote site. Where electronic collaborative material is used in the meeting, the display is divided into a video portion and a collaboration portion. In some embodiments the video portion and the collaboration portion are arranged in an angular relationship wherein the collaboration section and the video section are offset at an angle less than 180 degrees relative to each other. In some embodiments the angle is approximately a 90 degree offset.

This angular relationship supports a shoulder-to-shoulder collaboration experience, which simulates the real world where, as a user writes on a whiteboard, the user has other collaborators next to his/her shoulder. To further support the shoulder-to-shoulder collaboration experience a shoulder view camera is arranged on or about the video portion of the display and is focused on the area proximate to the collaboration section of the display in order to capture a meeting participant interacting with the collaborative section of the display.

In some embodiments, the angular arrangement of the display is created by arranging panels that make up the display into three sections: a first section, a central section positioned adjacent to, and between, the first and a third section. Each section can be offset from its adjacent section by an angle of less than 180 degrees.

As noted above the display can be configured to switch between a panoramic video mode and a collaboration mode. Such configuration is controlled by a display processor which generally controls switching the display from one mode to the other and controls where on the display the presentation portion and the collaborative portion of the display will be located.

In addition to the arrangement of the display, the arrangement of the room enhances the collaborative videoconference experience when used in combination with the arrangement of the display. As noted above the display can be arranged in a substantially concave configuration having a video section and a collaborative section. The room can be configured to have a presenter area adjacent to the collaborative section of the display, and a shoulder-view video camera configured to capture the presenter area.

Other collaborators are generally situated in a foreground meeting participant area positioned further from the collaboration section of the display than the presenter area. The foreground meeting participant area is configured such that collaborators in this area can easily approach the display, or they can remain in the foreground meeting participant area where they are in substantially full view of a camera, and can be presented to a remote site in almost life size.

The videoconferencing room is also arranged to have a background meeting participant area further away from the display than the foreground meeting participant area such that a person or object in the foreground meeting participant area can obscure from view, by the camera, a person or object in the background meeting participant area. Participants situated in this part of the room can interact with the collaborative videoconferencing system through a portable electronic device.

Room Arrangement

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a system that provides a more natural meeting environment that is particularly suited for (though not exclusively so) interactive and collaborative videoconference meetings wherein meeting participants interact both on a collaboration section of a display screen, and naturally view each other on a video section of a display screen.

FIG. 1 illustrates an exemplary top view of a layout of an immersive and interactive videoconference room environment 100 useful in hosting and participating in an interactive and collaborative videoconference meeting wherein meeting participants interact both on a collaboration section of a display, and naturally view each other on a video section of the display. Room 100 includes display 102 in a substantially "L-shaped" configuration. Display 102 can be made up of one or more panels. For example, FIG. 1 illustrates display 102 being made up of at least five panels, 102*a*, 102*b*, 102*c*, 102*d*, and 102*e*. Panels 102*a* and 102*b* make up a first section; panels 102*d* and 102*e* make up a third section, and panel 102*c* makes up a second, center section. Collectively the first section, center section, and the third section can be termed a video section in some modes of use. Each section is located adjacent to each other, but angularly arranged relative to each other. The first section (panels 102*a* and 102*b*) and the third section (panels 102*d* and 102*e*) are arranged at an angle of less than 180 degree relative to each other, and in some embodiments, the first and third section are arranged at an angle of approximately 90 degrees relative to each other. Both the first and third section are arranged at approximately the same angle with respect to the center portion, wherein that angle is less than 180 degrees, and in some embodiments that angle is approximately 135 degrees. Collectively the panels make up one integrated display screen that is arbitrarily dividable into multiple display sections. For example, in some embodiments, the first or the third section may be designated a collaboration section while leaving the remaining portion of the display (i.e., the third section and center section, or the first section and center section, respectively) designated a video section.

Display 102 is mounted upon, or located above apron 104. Apron 104 extends a distance in front of the panels and functions to prevent a meeting participant from standing too close to display 102 thus reducing inadvertent touching of display 102 which could result in unintentional commands being registered and/or damage to display 102.

The interactive videoconference room environment 100 of FIG. 1 further includes a plurality of cameras 106, 108, and 110. Camera 106 is a panoramic camera that is configured to capture a wide image of the room. In some embodiments, camera 106 is configured to be used in a panorama mode wherein the entirety of display screen 102 is used to display meeting participants. As illustrated in FIG. 1, camera 106 is located and near the middle of the room. In some embodiments, two cameras with a narrower viewing field can be substituted for a single panoramic camera. In such embodiments, the two cameras can be located substantially adjacent to each other to achieve a similar focal point. In some embodiments, one or more mirrors can be used to further align the focal points of the two cameras.

Camera 108 is a shoulder view camera and can be configured to be used in a collaborative mode, and is located near the edge of the third section and aimed at presenter zone 112 such that when a presenter is interacting with the collaboration section 102a, 102b (aka, first section) of display 102, the camera is pointed directly at the presenter's shoulder. Camera 108 also can capture other meeting participants in the room, although the prominent focus of this camera is on the presenter.

Camera 110 is a full room camera and is used in a presentation mode wherein the system is adapted to a more conventional presentation without in-room collaborators. In some embodiments, such as embodiments utilized in a presentation mode, room 100 can be configured without tables 115 and foreground meeting participant area 114.

The immersive and interactive videoconference room environment 100 of FIG. 1 also illustrates several meeting participant zones 112, 114, and 116. Presenter zone 112 approximately outlines a zone of interaction of a presenter. A presenter standing in this zone is able to interact with the collaboration section of the display 102 while being able to look at her remote audience displayed on the video section of the display 102 over her right shoulder via video camera 108. A presenter is thus able naturally interact with other meeting participants in a manner similar to collaborators working on a white board by looking over their shoulder to view in room meeting participants. Presenter zone 112 is thus characterized as a zone in which a presenter might stand that is between foreground meeting participant zone 114 and display 102. Further, at least a portion of the presenter zone 112 is located close enough to display 102 to allow a presenter standing in zone 112 to physically interact with display 102.

Foreground meeting participant zone 114 outlines an area for meeting participants that are not currently at the screen in presenter zone 112, but are in the foreground of the meeting. These meeting participants are in full view of camera 106 when display 102 is in panorama mode, or view of camera 108 when the display is in collaboration mode. These participants will appear substantially life-sized to remote meeting attendees. Meeting participant zone 114 can also include tables 115. As illustrated in FIG. 1, tables 115 do not substantially obstruct a foreground meeting participant from approaching the screen. Thus meeting participant zone 114 is characterized as being further away from the display 102 than presenter zone 112, yet having a substantially unobstructed view of the at least one of the portions of the display 102.

Background meeting participant zone 116 outlines an area for meeting participants sitting in the back of the room. These participants could be viewed on one of camera 106 or camera 108, if foreground-meeting participants do not occlude them from view. Background meeting participants are expected to be mostly observers, though as will be addressed in more detail below, these meeting participants may interact with the content on the screen via a personal computing device rather than having to approach the screen.

FIG. 2 illustrates exemplary local and remote interactive videoconference room environments. As illustrated local environment 120 is illustrated next to remote environment 120' shown in dashed lines. Each environment is a mirror image of the other when viewed through shoulder view camera 108 and 108'. The respective rooms are laid out as minor images because, when captured, both environments will look identical to the environment a user is in.

FIG. 3 illustrates an exemplary in-room-perspective view of the interactive videoconference room environment 100. Once again the interactive videoconference room environment 100 is illustrated having display 102 therein. As illustrated display 102 is comprised of a plurality of panels 102q, 102r, 102s, 102t, 102u, 102v, 102w, 102x, 102y, and 102z in a 2×5 grid. FIG. 3 also illustrates the exemplary locations of panoramic camera 106, and shoulder view camera 108. Tables 115, from foreground meeting participant zone 114, are also illustrated.

In addition to the features of the interactive videoconference room environment 100 already noted, environment 100 also includes speakers 117 and microphones 118. In the embodiment shown, speakers 117 are wall mounted and located directly behind either the first section or the third section of the display 102 so as to give a stereo effect to remote meeting participants. Likewise microphones 118 are located just above the first section and the third section of the display 102 so as to pick up audio proximate to one microphone or the other so that the directional qualities of the captured audio can be played back by the speakers 117 in the remote environment.

It will be apparent to those of ordinary skill in the art that the placements of cameras, speakers, and microphones are merely exemplary. Additionally, more or less cameras, speakers, and microphones could be used. While the placement of speakers and microphones in FIG. 3 permits basic directional audio features to be utilized, an array of speakers or microphones can be used to provide more advanced directional audio features such as features to recognize that a specific individual is speaking based on a sound field around that individual, as is known to those of ordinary skill in the teleconferencing art. Similarly, while the placement of cameras in FIG. 1 and FIG. 3 provides the basic views that are deemed most important, in one embodiment of the present technology, many other cameras can be used to uniquely focus on each individual in the conference. Video mapping techniques could then be used to blend the output of the many cameras into just one image, as is known in the video analysis and multiplexing art.

FIGS. 4A-4C illustrate exemplary details of one embodiment of a display arrangement of the interactive videoconference room environment. FIG. 4A illustrates a top plan view of the display arrangement 102. In FIG. 4A, the top portions of five display panels are illustrated in an arrangement such that the first two panels (making up the first display portion) are arranged at an angle with respect to the center portion, which is further arranged at an angle from the last two panels (making up the third display portion). Collectively, the three portions of panels make up a substantially concave shaped arrangement of displays. In the embodiment illustrated, the first portion and third portions are arranged at a 135 degree angle with respect to the center portion.

FIG. 4B illustrates a front plan view of the displays making up the first portion and the center portion. Therein it is illustrated that there are two rows of displays—one stacked on the other. The rows of displays are supported above apron 104.

FIG. 4C illustrates a front plan view of the displays making up the third portion and the center portion. Therein it is illustrated that there are two rows of displays—one stacked on the other. The rows of displays are supported above apron 104.

It will be appreciated by those of ordinary skill in the art that while display 102 is illustrated herein as being made up of a plurality of panels, more or less panels can be used. In some embodiments, only one panel might be necessary, such as a flexible OLED display. If a flexible display were to be used, an angular relationship between portions of the display would not be needed and a continuously curved display or partially curved display could be used and still form a generally similar configuration.

FIG. 5A illustrates an exemplary collaboration system mode, wherein display 102 is divided into collaboration portion 102g, and video portion 102h. It will be appreciated by those of ordinary skill in the art that, while collaboration portion 102g is located on the right side of display 102, collaboration portion 102g could be located on the left side of display 102.

FIG. 5A further illustrates two collaborators working together using the present technology. Collaborator 140 is a local collaborator viewing remote collaborator 145 interact with collaboration portion 102g of display 102. Not only can remote collaborator 145 be seen interacting with display 102 on video portion 102h of display 102, but virtual hand 147 also reflects remote collaborator's interaction with display 102 such as pointing to a position of a display, drawing, erasing, etc. In some embodiments, all interactions with collaboration portion 102g of display 102 are reflected to the other end of the collaborative videoconference so that other collaborators are aware of all actions happening on the board, just as they would if they were in the same physical room together with the remote collaborators.

FIG. 5B illustrate an exemplary panoramic mode wherein the entirety of display 102 is used to display a video feed of remote meeting participants. As illustrated in FIG. 5B, in this mode, meeting participants are able to naturally engage each other in a face-to-face conversation, rather than be obstructed by tables and perceived distance. Meeting participants are able to approach the screen and appear to stand as they would in a conversation if they were in the same physical room. Also illustrated in FIG. 5B, the entire remote room is visible to all meeting participants, thereby making a meeting more engaging for them as well.

In some embodiments, meeting participants can be recognized and tracked, and their names or other identifier can be used in a label 150 appearing above the video image of each program participant. As will be discussed in greater detail below, the present technology can be configured with facial recognition software, skeletal tracking cameras, voice recognition software, and/or directional audio software, etc. Each of these technologies can be utilized to track a meeting participant's movements throughout the meeting room. Further, since the system can be configured to track a meeting participant, it can also be configured to record various metadata regarding each program participants interactions throughout the meeting.

In addition, FIG. 5B also illustrates an attendance roster 152 including the names of each meeting participant known to be attending the meeting. In some embodiments, these names can be derived from user accounts associated with personal computing devices known to be in the meeting room, or they can be derived from an invitation to the meeting; they can also be entered by meeting participants.

System

Figure 6:
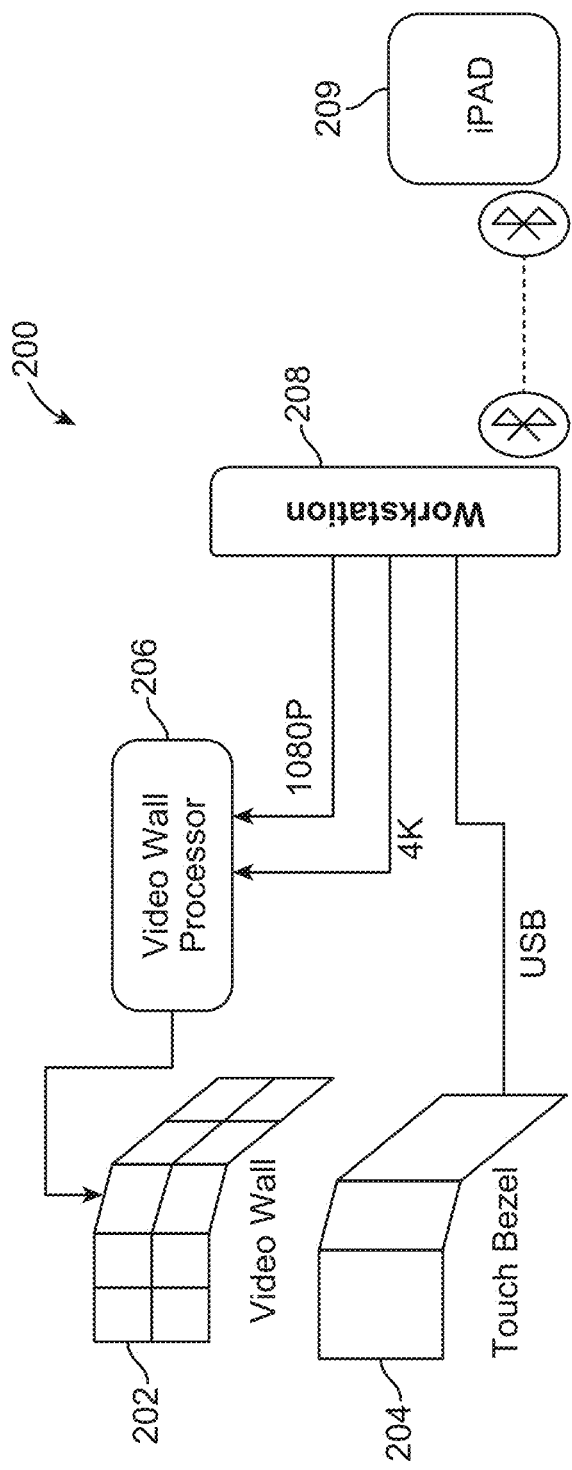
FIG. 6 illustrates an exemplary local system embodiment.

FIG. 6 illustrates an exemplary system embodiment. The illustrated system embodiment can represent a system used by both local and remote meeting participants to conduct an interactive videoconference. For example, both local and remote meeting participants can have access to a system such as system 200, which can be used to communicate between local and remote meeting participants.

Figure 20A:
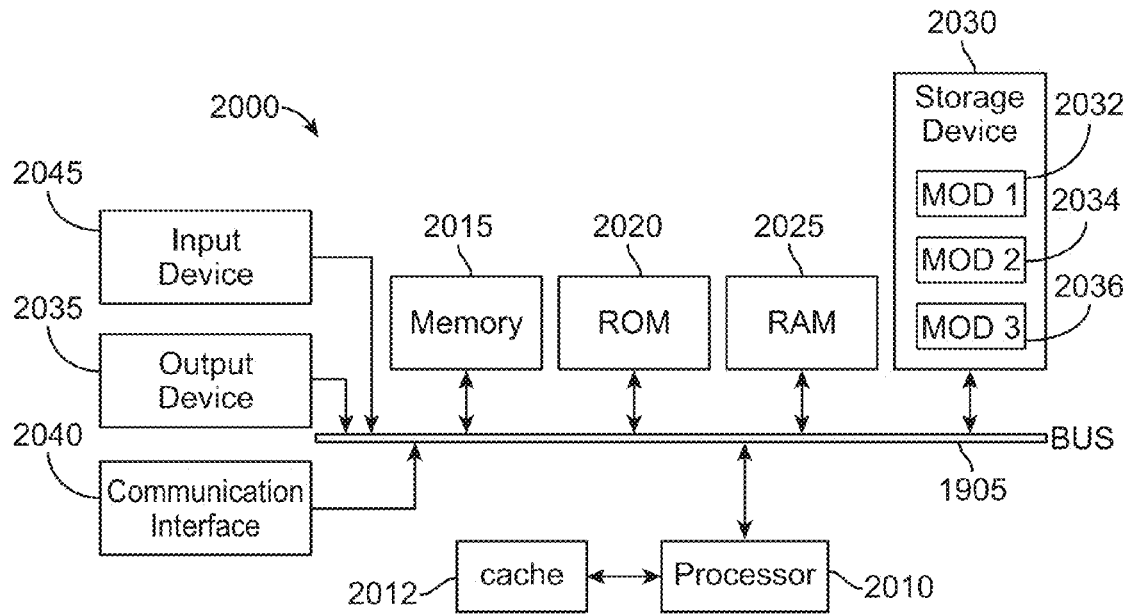
FIG. 20A and FIG. 20B illustrate exemplary computing system embodiments.
Figure 20B:
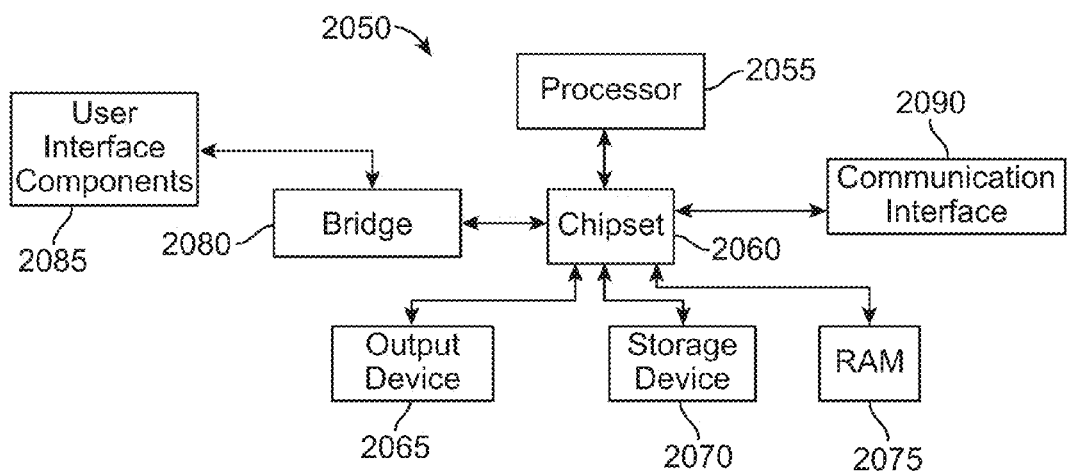

As illustrated system 200 includes computing device 208. Computing device 208 can be any type of computing device capable of network communication with other computing devices. For example, computing device 208 can be a personal computing device such as a desktop or workstation, a business server, or a portable computing device, such as a laptop, smart phone, or a tablet PC. Computing device 208 can include some or all of the features, components, and peripherals of the computing device illustrated in FIGS. 20A and 20B. For example, computing device 208 can include input and output devices as illustrated in FIGS. 20A and 20B.

As illustrated, computing device 208 can be configured to output to display 202 and receive input from touch device 204. While display 202 and touch device 204 are illustrated as separate devices, this is for explanatory purposes only. Display 202 and touch device 204 can form an integrated touch display device wherein display 202 represent the display portion of the device, and touch device 204 represents touch display hardware.

In some embodiments touch device 204 can be a bezel for transmitting and receiving infrared beams. In embodiments utilizing a touch bezel, the bezel may be modified from those bezels known in the art. Conventional touch screen bezels often form a border around the display device and transmit infrared beams in a horizontal and vertical direction. However, because the first portion and third portion of the display both border the center portion at an angle, and it is not desirable to place a bezel between the portions of the display, infrared beams cannot be transmitted in the horizontal direction. As such, a bezel system can be modified to transmit only vertical beams to detect touches and gestures on the display. In some embodiments touch device 204 can be another type of touch device such as a capacitive touch device layered onto display 202 or a touch foil layered onto display 202, or a camera-based touch device layered onto or behind display 202.

Inputs received by touch device 204 can be transmitted to computing device 208 for interpretation, and responsive action. Computing device is configured to interpret inputs received by touch device. Some inputs and menu interfaces apply system wide, while some inputs and menu interfaces are application or context dependent.

Computing device 208 can provide one or more video outputs to video wall processor 206 which is configured to display the one or more video outputs to the appropriate portion of display 202. For example computing device 208 can output a video of remote participants as well as display data for a collaborative workspace. The video of the remote participants can be displayed in the video portion of display 202, while the collaborative workspace can be displayed in the collaboration portion of the display 202. In embodiments wherein only a video portion is output, video wall processor 206 can output the entire video to display 202.

In some embodiments, selection of which panels are used for a collaboration portion and which panels are used as a video portion can be configurable. For example, video wall processor 206 can be configured to vary the arrangement of display 202 to in response to receiving a command from computing device 208.

Further, computing device 208 can be configured to communicate with other computing devices. For example, computing device 208 can include an interface for communicating with personal computing device 209. In some embodiments, personal computing device 209 can connect to the computing device 208 via a short field communication protocol such as BLUETOOTH. Alternatively, personal computing device 209 can communicate with computing device 208 over an available network. Although computing device 208 is connected to only personal computing device 209, this is just an example and is not meant to be limiting. Computing device 208 can be configured to communicate with any number of personal computing devices.

In some embodiments, computing device 208 can be configured to record input received at computing device 208. Input can include any type of input received from any of a variety of possible input devices used in conjunction with computing device 208. For example, input can include any touch input received from touch device 204 as well as any input received from an input device not illustrated in FIG. 6, such as input received from a keyboard, mouse, microphone, etc. Further, in some embodiments, computing device 208 can record input received form any other computing device communicating with computing device 208, such as personal computing device 209.

In some embodiments, computing device 208 can be configured to record received inputs in an input journal stored in memory on computing device 208. Alternatively, in some embodiments, the input journal can be stored at another computing device in communication with computing device 208.

In some embodiments, the input journal can include metadata describing each input received by computing device 208. This can include metadata describing the type of input, the input device the input was received from, the time the input was received, the location the input was received from, a computing device the input was received from, etc.

Figure 7:
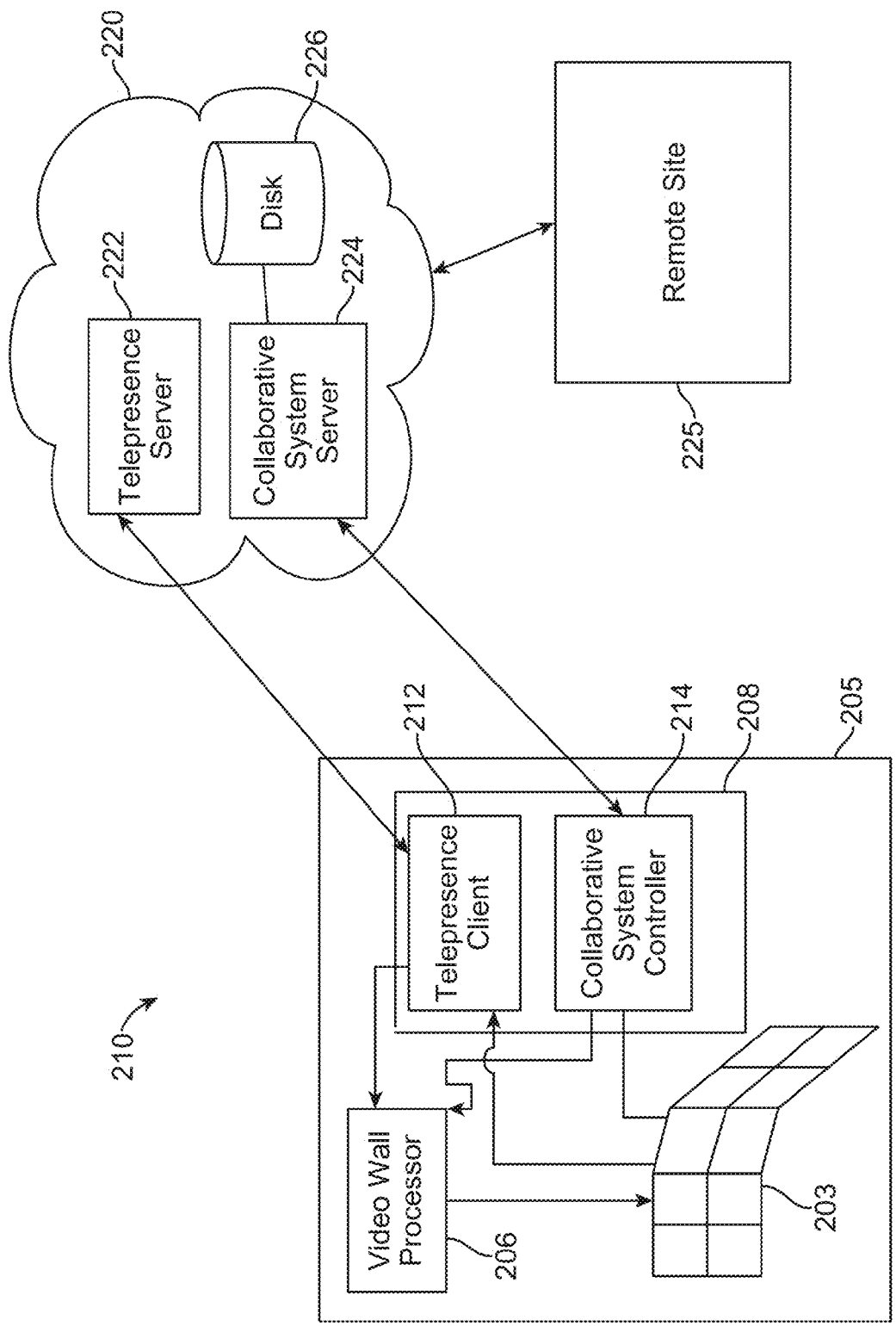
FIG. 7 illustrates an exemplary networked system embodiment.

FIG. 7 illustrates an exemplary networked system embodiment. Networked system 210 illustrates local site 205 and remote site 225, both of which communicate with and through cloud computing system 220. While local site 205 is illustrated with additional details, in some embodiments both local site 205 and remote site 225 have substantially the same components. For example, both local site 205 and remote site 225 can include some or all of the features, components, and peripherals of system 200 illustrated in FIG. 6.

As illustrated, local site 205 can include computing device 208 configured to receive input from and output input to display 203. Display 203 can represent both display 202 and touch system 204 from FIG. 6. Display 203 can be in electrical communication with video wall processor 206, which, as in FIG. 6, is configured to display the one or more video outputs to the appropriate portion of display 203.

Display 203 can also be in electrical communication with computing device 208 to communicate with collaboration system controller 214 and telepresence client 212. Although collaboration system controller 214 and telepresence client 212 are illustrated as being hosted by a single device, in some embodiments, collaboration system controller 214 and telepresence client 212 can be hosted by separate computing devices.

Computing device 208 can further be in electrical communication with video wall processor 206, whereby telepresence client 212 and collaboration system controller 214 can output content to be displayed on display 203 via video wall processor 206, which is configured to display the one or more video outputs to the appropriate portion of display 203.

Telepresence client 212 can receive input from display 203, or more specifically a camera and microphone mounted on or about display 203, and transmit this information to telepresence server 222 in cloud 220. Telepresence server 222 can be configured to receive input from a telepresence client, such as telepresence client 212, and forward video and audio streams to another telepresence client, such as a telepresence client at remote site 225, for display on a display of remote site 225.

Likewise collaboration system controller 214 can be configured to receive input from display 203, process these interactions and generate resulting output which can be transmitted to video wall processor 206 for display on display 203. Collaboration system controller 214 can be further configured to translate the received interactions into a communication protocol used to communicate with collaboration system server 224.

Collaboration system server 224 can be configured to receive communications from collaboration system controller 214 and to determine appropriate interactions for other collaboration system clients (for example at remote site 225) to take based on the received communications, and to send these instructions to remote site(s) 225 where the instructions are interpreted by collaboration system controller 214 and interactions are displayed.

One example of a communication structure between collaboration system controller 214 and collaboration system server 224 is as follows:

```
Public class CollaborateDataNg
{
public string TypeID;
public string Operation;
public string Data;
public int Flag;
public long TimeStamp;
public string ObjectID;
public bool IsSendBack;
public string Policy;
}
```

Collaboration system server 224 can also be configured to store a log of system communications, and files shared or accessed during the collaboration in disk 226. For example, the input can be recorded in an input journal stored in disk 226. Disk 226 can be a storage device with a navigable directory structure or it can represent a cloud storage service, file share service, document management service, or any other data storage known to those of ordinary skill in the art. The input journal can include a time stamped record of input received from either one or both of local site 205 and remote site 225.

The system illustrated in FIG. 7 allows the portions of the system at a local site to handle all local system functions, and as such, to be responsive to local inputs, while at the same time utilizing the processing power of the collaboration system server to interpret and mediate communications between a local site and remote site.

While certain resources are illustrated as being either local or being part of a cloud system, it should be appreciated that this is merely exemplary. Some resources illustrated as being in the cloud, could in fact be local and some resources that are indicated as being local, could in fact be in the cloud. Additionally, some local resources could be mirrored at one or more sites, including in the cloud.

Multi-Site Screen Interactions

System 210 of FIG. 7 can be configured to enable meeting participants at local site 205 and remote site 225 to collaborate with each other via the collaboration portion of display 203. For example, user inputs provided by meeting participants at local site 205 and remote site 225 can be represented on the display at both local site 205 and remote site 225, thus the meeting participants are working together on the same workspace as if they were in the same location.

User inputs can include any input, command, etc. made by a meeting participant. This can include facilitating or causing execution of and interaction with applications, adding and modifying content, rearranging content windows, etc. To accomplish this, user input, such as input received at display 203, can be translated into data and transmitted to collaborative system server 224. Collaborative system server 224 can then process the received input data and transmit a corresponding command to remote site 225 to modify the display to reflect the user input received at local site 205.

For example, upon receiving input at display 203 adding text to a presentation, collaborative system controller 214 can transmit the received input data to collaboration system server 224. Collaboration system server 224 can then process the received input data and transmit a corresponding command to remote site 225 to display the text added by the input received at local site 205.

As a result, changes made at one site can be mirrored at the other site so that meeting participants at each site are presented with the same content. For example, text added to a presentation at local site 205 can be added to the presentation at remote site 225. Likewise, changes made at remote site 225, such as changing slides of a presentation, can be presented at local site 205.

To further create the illusion that meeting participants at local site 205 and remote site 225 are working together at the same location, in some embodiments, system 210 can be configured to present graphics representing the meeting participants on the interactive display, in addition to the changes made by the meeting participants. For example, if a meeting participant at local site 205 performs an action, such as drawing a circle on a presentation, content representing the meeting participant, such as a virtual hand, can be presented along with the drawn circle at remote site 225. Meeting participants at remote site 225 can thus visualize the meeting participant at local site 205 adding the circle. In some embodiments, the graphic representing the remote meeting participant is approximately life sized. In some embodiments, the graphic representing the remote meeting participant can be illustrated holding a tool appropriate for performing the given task. For example, a substantially life sized hand could hold a marker when drawing a circle, or hold an eraser when erasing, etc. In some embodiments, these tools can be selected from a system or application menu.

In some embodiments, the meeting participant content can identify the type of input made by the meeting participant as well as a tool used by the meeting participant. For example, if a meeting participant at local site 205 enters input using their hand to touch screen 203, meeting participant content representing a virtual hand touching the screen can be presented at remote site 225. Alternatively, if the meeting participant at local site 205 enters input using a tool, such as an eraser or pen, on screen 203, the meeting participant content presented at remote site 225 can represent the tool, such as a virtualized eraser or pen, or a virtual hand holding the tool.

To accomplish this, the data transmitted to collaborative system server 224 can identify the meeting participant input type received, such as meeting participant input received at a touch screen with a hand or tool. Collaborative system server 224 can then transmit a corresponding command to present meeting participant content representing the receiving meeting participant input to the appropriate collaborative system controller. For example, data received by collaborative system server 224 from local site 205 can identify that a meeting participant interacted with screen 203 using their hand. Collaborative system server 224 can then transmit a command to the collaborative system controller at remote site 225 to present meeting participant content representing the touch input received at local site 205. This can include presenting a virtual hand on the display at remote site 225.

While the examples given above involve presenting meeting participant content along with changes made by the meeting participant, such as adding text, images, etc., this is only an exemplary scenario and is not meant to be limiting. In some embodiments, meeting participant content can be presented even if it is not associated with a resulting change in content. For example, meeting participant content representing a user touch can be presented even if the user touch does not result in any change. Thus, a touch input received at local site 205 can be presented as meeting participant content at remote site 225, even if the touch input was not associated with a command, change in content, etc.

In some embodiments, system 210 can be configured to present content as active content at one site and inactive content at the other site. For example, collaborative content such as text, images, etc., that meeting participants at both local site 205 and remote site 225 may need to modify as part of their collaborative efforts, can be presented as active content at both local site 205 and remote site 225. Active content can be content that can be modified by meeting participants.

Alternatively, non-collaborative content, such as a local site command window, that is not part of the collaborative efforts of the meeting participants, can be presented as active content at one site and non-active content at the other site. For example, a local site command window initiated by a meeting participant at local site 205 to change a local setting does not need to be modified by a meeting participant at remote site 225 because the local site command window is not part of the collaborative content being worked on by the meeting participants at local site 205 and remote site 225. Thus, the local site command window can be presented as active content on local site 205, meaning that meeting participants at local site 205 can interact with the local site command window, and the local site command window can be presented as inactive content at remote site 226, meaning that meeting participants at remote site 225 cannot interact with the local site command window. Presenting the non-collaborative content as inactive content at remote site 225 notifies the meeting participants at remote site 225 to user interactions being performed at local site 205, while restricting the meeting participants at remote site 225 from engaging the non-collaborative content.

In some embodiments, the non-collaborative content can be presented to look the same when it is active content and non-active content. Alternatively, in some embodiments, the non-collaborative content can be presented differently when it is active versus non-active content. For example, non-active content can be presented in a shadowed or blurred presentation to indicate that the content is non-active.

Collaborative system server 224 can be configured to determine whether the content should be presented as active content or inactive content. For example, upon receiving an input from local site 205, collaboration system server 224 can be configured to determine whether the content should be presented as active content or inactive content at remote site 225 and transmit a command to remote site 225 to present the content as either active content or inactive content.

In some embodiments, collaborative system server 224 can be configured determine whether the content should be presented as active content or inactive content based on the type of content. For example, collaborative content such as text, images, etc., can be presented as active content, whereas non-collaborative content, such as local site command windows, settings windows, etc., can be presented as non-active content. Collaborative system server 224 can be configured to identify the content type and determine whether the content should be presented as active content or non-active content.

In some embodiments, system 210 can be configured to enable meeting participants to select content to be presented as inactive content. For example, a meeting participant at local site 205 may want to add content that cannot be modified by meeting participants at remote site 225. In this embodiment, a meeting participant can select to have the content presented as inactive content at remote site 225. For example, in some embodiments, the meeting participant can select a setting that the content be presented as inactive content at remote site 225.

In this type of embodiment, data indicating that the meeting participant has selected to have the content presented as inactive content can be transmitted to collaborative system server 224. Collaborative system server 224 can then transmit a command to remote site 225 to present the content as inactive content.

Figure 8:
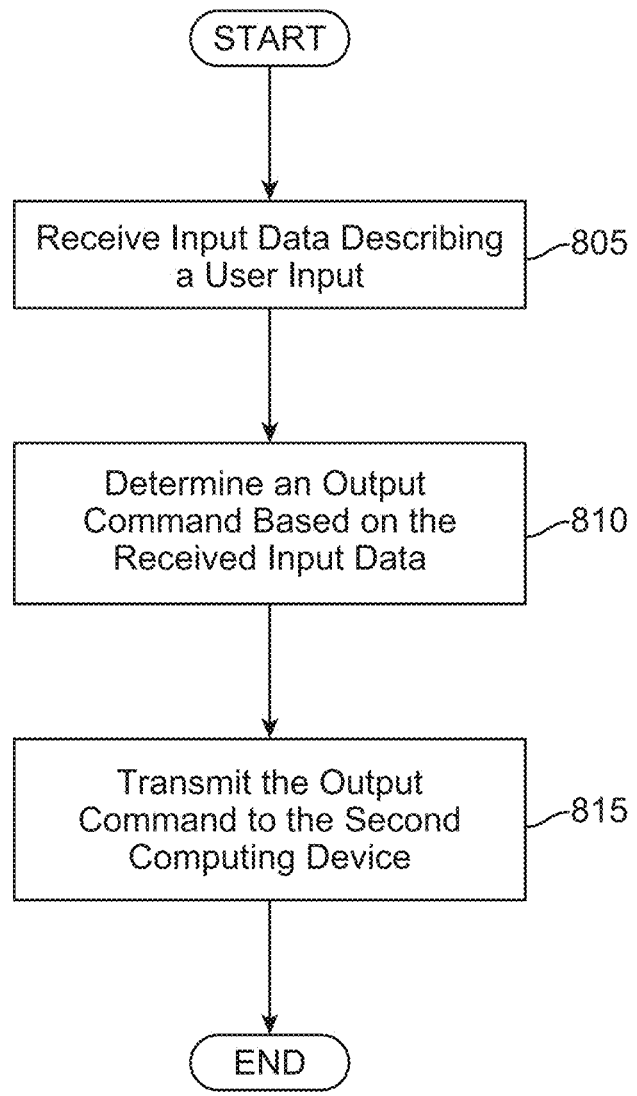
FIG. 8 illustrates an exemplary method embodiment of enabling meeting participants at multiple sites to collaborate with each other.

FIG. 8 illustrates an exemplary method embodiment of enabling meeting participants at multiple sites to collaborate with each other via a collaboration portion of a video-conference. As illustrated, the method begins at block 805 where input data describing a user input is received. The input data can be received from a first computing device engaged in a video-conference with a second computing device. For example, the first computing device can be locally executing the video conference at a first site and the second computing device can be locally executing the video conference at a second site.

The input data received can describe a user input received by the first computing device at the first site. For example, the user input can be an input such as a selection made on a touch screen presenting the video conference at the first site. In some embodiments, the user input can be an input to modify the content on the video screen, such as adding text, images, etc. Alternatively, in some embodiments, the user input can be an input to open or close a content window, change settings, etc.

Upon receiving the user input, the method continues to block 810 where an output command is determined based on the received input data. An output command can be a command instructing the second computing device to modify the video-conference presented at the second site based on the user input received at the first site. In some embodiments, the determined output command can instruct the second computing device to modify the video-conference presented at the second computing device according to the user input received at the first computing device. Thus changes made at the first computing device can be reflected at the second computing device and vice-versa.

For example, upon receiving input data indicating that a user input to add text was received at the first computing device, the output command can instruct the second computing device to add the same text presented by the first computing device. Alternatively, upon receiving input data indicating that user input to close an active content window was received at the first computing device, the output command can instruct the second computing device to close the active content window.

In addition to mirroring changes presented at the first site, in some embodiments, determining an output command can include whether to present content at the second computing device as active content that can be modified by meeting participants at the second site, or inactive content that cannot be modified by meeting participants at the second site. In some embodiments, this determination can be based on whether the content is collaborative or non-collaborative content. For example, collaborative content that is part of or relating to the collaborative efforts of meeting participants at both the first and second site, such as text, images, etc., can be presented as active content. Alternatively, non-collaborative content that is not part of the collaborative efforts, but rather affects or is related to only the first site, such as local site command windows to modify settings of the first computing device, can be presented as inactive content that cannot be modified by meeting participants at the second site.

In some embodiments, determining an output command can include determining whether to present meeting participant content. Meeting participant content can include content that represents the meeting participant. For example, meeting participant content can include a virtual hand representing a touch input received from a meeting participant at the first site. In some embodiments, the input data can include data describing the input method, such as a touch with a hand, tool, etc., and the output command can instruct the second computing device to present meeting participant content representing the input method.

Figure 9:
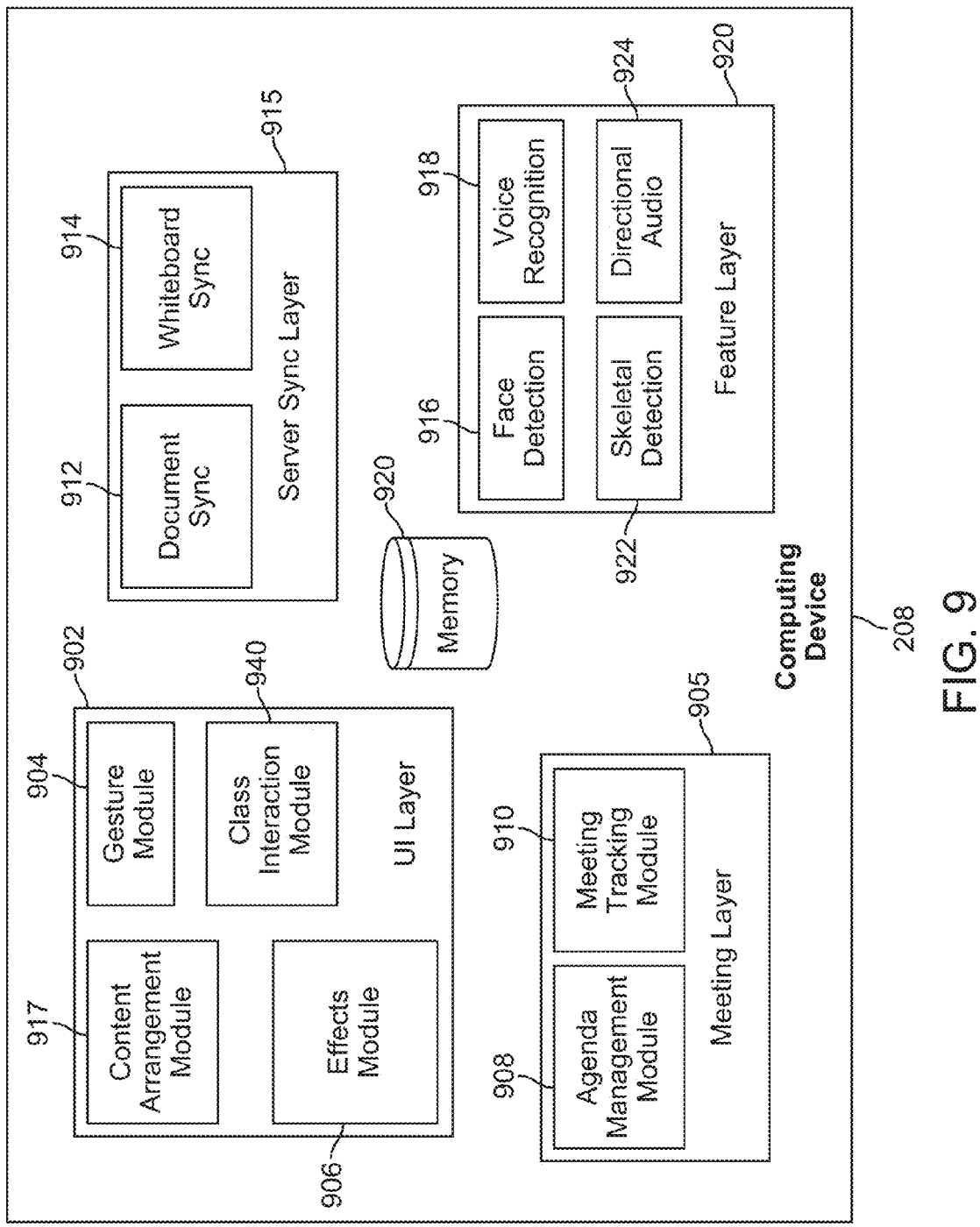
FIG. 9 illustrates an exemplary embodiment of a computing device configured to arrange content windows presented on a display.

Upon determining an output command, the method then continues to block 815 where the output command is transmitted to the second computing device, which can result in the second computing device modifying the video-conference presented at the second site according to the output command. The method then ends. FIG. 9 illustrates a collection of modules and/or services for providing various services and/or features of the collaboration system. It will be appreciated that one or more these services may be removed, or other features may be added. In some embodiments these features are provided by the computing device 208, or in some embodiments the collaborative system controller 214. These features can be provided in combination with resources of cloud 220, or provided entirely by the portions of the system at the local site 205.

The services of FIG. 9 are arranged into a plurality of layers including user interface (UI) layer 902, meeting layer 905, server sync layer 910, and feature layer 920. The layers can be considered functional groupings of related services. In some embodiments the related services can be part of a software framework architected with one or more layers for providing services, however FIG. 9 should not be considered so limited, unless otherwise specified.

FIG. 9 illustrates a UI layer 902 for providing services related to user interface inputs and outputs. For example the UI layer includes a gesture module 904 that can be configured to receive raw touch input data, and interpret such data into a command that is actionable by the computing device 208. For example, the gesture module 904 can receive data indicating an initiation point of touch, a termination point of touch and a time or velocity of the touch. The gesture module can recognize this data to describe a swipe action and instruct the computing device 208 to perform a command. In some embodiment the command issued may be context or application dependent. For example a single-finger-swipe received in a white board application will be interpreted to draw a line, while the same gesture received in a stickynote application will move or arrange the note. These gestures can be considered application specific or context specific gestures. In some embodiments, the same gesture can be a system-wide gesture and thus will be interpreted the same way regardless of where the gesture is initiated. For example, a two-finger-horizontal swipe could be interpreted to expand the video to panorama mode, or initiate the collaborative mode regardless of where that gesture is initiated or received. Thus gesture module is responsible for not only determining what type of gesture was received, but also what command corresponds to that gesture given the context in which the gesture was initiated or received. Table 1 below presents a few exemplary gestures and describes their function and whether or not they are a system-wide gesture or application or context specific gesture.

TABLE 1

| Gesture | Function(s) |
| --- | --- |
| Single finger tap | System-wide: select |
| Single finger press and hold | System-wide: show related menu |
| Single finger swipe | Whiteboard application: draw |
|  | Stickynote app, header context: move |
|  | Stickynote app, group context: ungroup |
| Two finger swipe | Document context: next page |
|  | Whiteboard app: move |
|  | Stickynote app: move |
|  | Desktop/Video contexts: switch between presenter and collaborative modes |
| Two finger pinch (or reverse pinch) | System-wide: zoom in (or zoom out) on selected area |
| Five finger grab | System-wide: switch to overview mode |

The effects module 906 can be configured to cause the computing device 208 to display various effects on the display. Some exemplary effects include introducing translucent or transparent effects, providing shadows, adjusting colors, and other UI effects that are generally known in the art. In some embodiments, computing device 208 can receive instructions from collaborative system server 224 to introduce certain effects which can be implemented using the effects module 806. This can enable the collaborative system server 224 or even a remote collaborative system client to cause the local collaborative system client 214 to introduce the same effects for all client systems, or in some embodiments, to introduce different effects at one client that from a client so as to indicate that an interaction was provided by a user at a remote site.

The UI layer also includes a content arrangement module 917 which is configured to arrange content on the display. The content arrangement module 917 will be described in more detail below.

FIG. 9 also illustrates a meeting layer 905. Meeting layer 905 can generally include software executed by the computing device 208 for running and tracking a meeting with collaborative system. Meeting layer can include modules for keeping track of meeting participants, recording a meeting, generating metadata regarding details in the meeting, etc. Two exemplary modules are illustrated in FIG. 9, namely the agenda management module 908, and meeting tracker module 910. The agenda management module 908 can perform functions such as displaying a meeting agenda, or provide a notice of elapsed time in a meeting. It can further be configured with prompts or alerts to remind meeting participants of the schedule agenda. The meeting tracker module 910 can be configured to record various metadata regarding interactions received by the system during the meeting and store them in memory 920. The meeting tracker module can be configured to record interpreted touch commands, actions received in software, context shifts, etc. Preferably each item of data can include a timestamp. In some embodiments, the system can be configure with semantic voice recognition such that it can recognize shifts in the topics discussed in the meeting and note those shifts. In some embodiments the system can recognize when different meeting participants are speaking and record the identity of the speaker along with the audio of that meeting participant's communication. It will be appreciated that all sorts of data can be recorded and indexed using the meeting tracker module 910.

FIG. 9 also illustrates a feature layer 920. The feature layer can include one or more features, whether designed specifically for use in the collaborative meeting system described herein, or designed for more general computing environments. While the features illustrated in FIG. 9 may appear to have a commonality to them, this is merely a coincidence and other features being dissimilar to those illustrated in feature layer 920 can be included. It will also be appreciated that a person of ordinary skill in the art could divide the feature layer 920 into one or more layers of common features. Such implementations are considered to be within the scope of the present technology.

One feature that can be implemented by computing device 208 is a face detection feature. In some embodiments face detection module 916 can be configured to learn meeting participants facial characteristics and locate/track them as they move about the meeting room. In some embodiments, face detection module 916 can further be configured to provide tags above or near a meeting participants face to identify the user.

Another feature that can be implemented by computing device 208 is a directional audio module 924. In some embodiments the directional audio module can be used to determine where a meeting participant is generally located in the meeting room, and can report this information to the collaborative system server 224 which can then instruct a client at a remote site 225 to play the audio associated with that meeting participant from the closest location in the remote site 225 having a speaker as the original audio in the local site was captured. For example, the directional audio module can determine that the current audio being received by the system at a local site is coming from the right side of the meeting room (implicitly from a meeting participant on the right side of the meeting room), and report this to the collaborative system server 224. The collaborative system server could then instruct speakers on the left side of the remote site meeting room (the camera reverses the image of the local site so that the right of the local site, appears on the left of the screen at the remote site) to playback the captured audio which can give the system a more natural in-room feel.

In some embodiments, the directional audio module 924 could also be used to somewhat determine where a meeting participant is in the room relative to other meeting participants. By using an array of microphones and detecting when various audio is received by each microphone in the array it is possible to determine where a meeting participant is from triangulating the location of the user from data indicating how far from each microphone the meeting participant must be.

Another feature that can be implemented by computing device 208 is a voice recognition feature 918. In some embodiments the voice recognition module 918 can learn the voices of meeting participants and identify each user by their speech. This information can be used to identify a speaker by name, and to tag speech from that user by meeting tracking module 910, In some embodiments the voice recognition module 918 can be combined with the functions of a directional audio module 924. In such embodiments the system can correlate the unique users identified by the voice recognition module, and the relative location of each user in the room determined by the directional audio module and identify each user on the display be recognizing unique entities on the display, if facial recognition were not working because one or more users were not facing the camera or not available.

In a more standard user of voice recognition, the voice recognition module can recognize certain verbal commands and thus theses commands can be used to interface with the system. For example, if a meeting participant in the foreground meeting participant area 114 desired to interact with the screen and cause a function to be performed, this would be best achieved verbally since the meeting participant is not within reach of the display.

In embodiments wherein the voice recognition module 918 can uniquely recognize a user by voice, a presenter could limit other meeting participants from being able to cause the system to respond to their spoken commands. Alternatively, the same functionality could be used to grant individuals privileges to control the system with voice commands.

FIG. 9 also illustrates a server sync layer 915 which is configured to provide services for sync actions and content with the cloud 220 to be stored in the cloud or distributed to remote site 225. FIG. 9 illustrates two exemplary sync services, a document sync 912, and a whiteboard sync 914. The document sync service can be configured to sync documents displayed on the collaborative portion of the display 203. In some embodiments, cloud 220 includes a directory on storage disk 226 that is accessible by the collaborative system described herein as well as meeting participants. In such embodiments, the document sync saves changes to a document displayed by the collaborative system and modified at one or more of the sites 205, 225 during a collaborative meeting. The document, in its modified form will be accessible to all meeting participants during and after the meeting. In some embodiments, storage disk 226 could be a storage service such as a cloud based storage system or document management system, etc.

The whiteboard sync module 914 is configured to report commands issued within computing device 208 relevant to the content displayed upon the display 203, or appearance of items on the display 203. As noted above the local computing device 208 is configured to report all such commands to the cloud 220 for recordation at the cloud and/or interpretation and dispatch of commands to the remote sites 225. Such action is performed or at least facilitated by the whiteboard sync module 814.

Optimization for Large Format Display

The present technology is optimized for use on a large-format display, though the technology is not restricted to use on such displays. As used herein, a large-format display is one in which the display size is so large that an average user cannot reach from one side of the display to the other without shifting position. In some embodiments, a large format display has a diagonal distance measuring 55 inches or greater. In some instances, a large format display might constitute a video wall or video walls as illustrated in FIGS. 1-5 herein.

As large format displays may require a user to move from one position in front of a display to another position just to select a user interface features, certain optimizations are desirable to bring user interface features closer to the user, or make changing position by the user unnecessary. Such optimizations are disclosed herein.

While system 210 is presented with specific components, it should be understood by one of ordinary skill in the art, that the architectural configuration of system 210 is simply one possible configuration and that other configurations with more or less components are also possible. For example, in some embodiments, system 210 can be configured to arrange content windows displayed on display 203.

FIG. 9 also illustrates content arrangement module 917, within UI layer 902, configured to arrange the location at which content windows are displayed on display 203. Content windows can be any type of window that can be presented by computing device 208. For example, content windows can include application windows, windows within an application, command windows, notification windows, control windows, document windows, etc.

Content arrangement module 917 can be configured to communicate with the operating system on computing device 208 and/or any applications running on computing device 208 to arrange the location of content windows displayed by either the operating system and/or the applications.

In some embodiments, content arrangement module 917 can be a background process, such as a daemon, configured to communicate with the operating system to monitor user input and select the presentation location of content windows presented by computing device 208. For example, content arrangement module 917 can be configured to select the presentation location of the content windows upon receiving a presentation input requesting to present a content window on display 203. The presentation location of a content window can be the location on display 203 at which the content window is to be displayed.

A presentation input can be any type of input requesting that at least one content window be displayed by computing device 208. For example, the operating system on computing device 208 can enable multiple content windows to be executing simultaneously by computing device 208 and further enable a user to restore and minimize the content windows to navigate between the various content windows, as well interact with the desktop presented by computing device 208. A user input to restore a content window can be a presentation input because it requests presentation of a content window.

Content arrangement module 917 can be configured to monitor user input received by computing device 208 to determine if a presentation input has been received, and if a presentation input has been received, determine the presentation location of the content window on display 203. A user input can be any type of input such as a touch input, keyboard input, voice command, etc. For example, if content arrangement module 917 determines that a presentation input to restore a content window has been received, content arrangement module 917 can determine the position on display 203 at which the content window is to be displayed upon being restored.

The presentation location of the content windows can be determined based on numerous factors. In some embodiments, the presentation location can be based on the current position of the user. The current position of the user can be the location of the actual user in regards to display 203 or, alternatively, the location of a cursor controlled by the user to interact with display 203.

In some embodiments, the current position of the user can be determined based on the location of the presentation input. The location of the presentation input can be the location on display 203 that the presentation input was received. For example, if the presentation input was received as the result of a user touch on display 203, the location of the presentation input can be the touch coordinate at which the presentation input was received.

Alternatively, in some embodiments, the location of the presentation input can be based on a speaker that received the presentation input. For example, when the presentation input is received as a voice command, the speaker which registered the voice command, or alternatively, the speaker which registered the voice command the loudest, can be used as the location of the presentation input. In some embodiments, the location of the presentation input can be determined based on the volume the voice command was received at multiple speakers. For example, the volume the voice command was received from each speaker can be used to calculate the likely location of the user when the voice command was made.

Content arrangement module 917 can be configured to gather the location of the presentation input and use the location of the presentation input to determine the current position of the user. For example, in some embodiments, the current position of the user can be determined to be the location of the presentation input. Alternatively, the current position of the user can be determined to be within a predetermined distance of the location of the presentation input.

Content arrangement module 917 can then select a presentation location for the content window based on the determined current position of the user. Using the location of the presentation input to determine the current position of the user can be particularly effective when the display is a large display that is used as an interactive whiteboard/blackboard display or a large format video-conference display because the user often cannot interact with all portions of the display without physically changing their position in regards to the display. Thus the input received from the user often accurately indicates the location of the user in regards to the display.

Alternatively, in some embodiments, the current position of the user can be determined based on a user-input journal. For example, content arrangement module 917 can be configured to monitor computing device 208 for user-input and store metadata describing detected user-input in a user-input journal. In some embodiments, computing device 208 can include memory 120 configured to store the user-input journal and content arrangement module 917 can be configured to communicate with memory 115 to store the metadata describing the detected user input in the user-input journal. The metadata stored in the user-input history can be any data describing the user-input, including the location of the user-input, type of user input, the time the user input was detected, an application associated with the user input, etc. In some embodiments, the user-input journal can be the input journal described in regards to FIGS. 6 and 7.

Upon detecting a presentation input, content arrangement module 917 can be configured to access memory 120 and analyze the user-input history to determine the current position of the user. For example, in some embodiments, the current position of the user can be based on the location of the most recently detected user-input. This type of embodiment can be useful when the presentation input is not associated with a location, for example, if the presentation input was received using a remote device, voice command, keyboard, etc.

Alternatively, in some embodiments, the current position of the user can be determined based on an analysis of multiple user-inputs. For example, application arrangement module 115 can be configured to analyze the locations of multiple user-inputs to identify trends indicating the user's current position. For example, if the location of the user-inputs move consistently farther away from an initial location in the same direction, content arrangement module 917 can determine that the user is moving from the location in the determined direction, and thus estimate a current position of the user based on the detected motion. Alternatively, if the location of the user-inputs indicates that multiple user-inputs are grouped in one particular location, it can be determined that the user is not moving and thus the user's current position is near the grouping of user-inputs.

In some embodiments, the current position of the user can be based on an analysis of the entire user-input history. Alternatively, in some embodiments, the current position of the user can be determined based on a subset of the user-input history. For example, the current position of the user can be based on the user-inputs detected within a predetermined time frame, such as the previous minute, 30 seconds, etc., prior to the receiving the presentation input. Alternatively, in some embodiments, the current position of the user can be determined based on an analysis of a predetermined number of user-inputs recorded in the user-input history. For example, the current position of the user can be based on an analysis of the most recent five, ten, etc., user-inputs.

Upon determining the current position of the user, content arrangement module 917 can be configured to select a presentation location on the display to present the content window. In some embodiments, the presentation location can be selected to be within a predetermined distance from the determined current position of the user. For example, the presentation location can be within a predetermined number of pixels or, alternatively, a measure of distance such as predetermined number of inches, millimeters, etc., from the current position of the user.

Alternatively, in some embodiments, content arrangement module 917 can select the presentation location based on a section of display 203 that the current position of the user is determined to be within. For example, display 203 can be divided into three sections: left, middle and right. If the current position of the user is determined to be within the left section of display 203, the content window can be presented in the left section of display 203. Alternatively, if the current position of the user is determined to be within the right section of display 203, the content window can be presented in the right section of display 203.

After a presentation location has been selected by content arrangement module 917, the content window can be presented on display 203 at the selected presentation location. In some embodiments, content arrangement module 917 can be configured to present the application window in the selected presentation location. Alternatively, in some embodiments, the operating system can present the application window at the selected presentation location. For example, content arrangement module 917 can be configured to transmit the selected presentation location to the operating system and the operating system can then present the application window at the presentation location.

In some embodiments, a user input can request to present multiple content windows. For example, a presentation input, such as a specified touch screen gesture, keyboard input, user interface selection, voice command, etc., can request to restore multiple content windows, or present an overview of all windows (may include minimized and background windows). In this type of embodiment, content arrangement module 917 can be configured to select a presentation location for each of the content windows. In some embodiments, this can include each of the content windows requested to be displayed by the presentation input. Alternatively, this can include the content windows requested to be displayed by the presentation input as well as any other content windows being presented on display 203.

In some embodiments, content arrangement module 917 can be configured to select the presentation location of the content windows so that the content window determined to be most likely to be interacted with by the user is located closest to the current position of the user. The user can thus easily access the content window the user is most likely to access.

In some embodiments, content arrangement module 917 can determine which content window the user is most likely to interact with based on an analysis of a user-interaction journal that includes metadata describing detected user-interactions with the content windows. Content arrangement module 917 can be configured to monitor user-interactions with the content windows and record metadata describing the detected user-interactions in the user-interaction journal. In some embodiments, the user-interaction journal can be located in memory 120. In some embodiments, the user-interaction journal can be the input journal described in regards to FIGS. 6 and 7.

The metadata describing the user-interactions can be any type of metadata describing the user-interaction. For example, the metadata can describe the type of user interaction, the content window interacted with, the time of the user-interaction, etc.

In some embodiments, determining the content window that the user is most likely to interact with can be based on the content window that was most recently interacted with. In this type of embodiment, content arrangement module 917 can be configured to analyze the user-interaction journal to identify the content window that was interacted with most recently, and determine that the content window is the content window the user is most likely to need to interact with next. The content window that was interacted with most recently can be the content window associated with the most recently recorded user-interaction in the user-interaction journal, meaning that there is no record of user-interaction occurring after the most recently detected user-interaction in the user-interaction journal.

Alternatively, in some embodiments, the determination of which content window the user is most likely to interact with can be based on the type of user-interaction. For example, some user-interactions can be considered less meaningful or less indicative that the user is currently engaged with the content presented by the content window. User interactions such as moving a content window, for example, can be considered to be less indicative of the user being engaged with the content of the content window than, for example, a user-interaction made directly with the content of the content window.

In this type of embodiment, content arrangement module 917 can be configured to analyze the user-interaction journal to identify the content window associated with the most recent user-interaction indicative that the user is engaged with the content of the content window. Thus, user-interactions considered as less meaningful or less-indicative of the user being engaged with the content of the content window can be ignored. The content window associated with the most recent user-interaction indicative that the user is engaged with the content of the window can thus be determined to be the content window the user is most likely to interact with.

In some embodiments, the determination of which content window the user is most likely to interact with can be based on which content window received the most user-interactions. For example, content arrangement module 917 can analyze the user-interaction journal to determine which content window is associated with the most user-interactions and then determine that the content window that received the most user-interactions is the content window the user is most likely to interact with. Alternatively, content arrangement module 917 can determine that the content window associated with the most user-interactions indicative that the user is engaged with the content of the content window is the content window the user is most likely to interact with.

In some embodiments, content arrangement module 917 can be configured to analyze all the user-interactions recorded in the user-interaction journal to determine which content window the user is most likely to interact with. Alternatively, content arrangement module 917 can be configured to analyze a subset of the user-interactions recorded in the user-interaction journal to determine which content window the user is most likely to interact with. For example, content arrangement module 917 can analyze only the user-interactions recorded in the user-interaction journal during a predetermined time frame prior the presentation input being received, such as the user-interactions received in the previous 5, 10, 15, etc. minutes prior to receiving the presentation input. Alternatively, content arrangement module 917 can analyze a predetermined number of the user-interactions recorded in the user-interaction journal, such as the 10, 15, 20, etc., most recent user-interactions recorded in the user-interaction journal.

In some embodiments, content arrangement module 917 can be configured to determine only which one of the multiple content windows the user is likely to interact with. Alternatively, in some embodiments, content arrangement module 917 can be configured to rank the content windows based on how likely the user is to interact with the content window. For example, content arrangement module 917 can use any of the techniques described above to rank the content windows from the content window the user is most likely to interact with to the content window the user is least likely to interact with.

Content arrangement module 917 can be configured to select a presentation location for each of the content windows based on the determination of which content window the user is most likely to interact with. For example, in some embodiments, the selection position of each content window can be based on how likely the user is to interact with the content window. Thus, the content windows can be presented in an order such that the content window the user is most likely to interact with is presented at a location closest to the current position of the user and the content window that the user is least likely to interact with is presented with is presented farthest from the user's current position.

In some embodiments, the user-interaction journal can include user-interactions detected on multiple computing devices. For example, as illustrated in FIG. 7, the user-interaction journal can be stored on disk 226 in cloud 220. Computing devices at both local site 205 and remote site 225 can be configured to communicate with disk 226 to record detected user-interactions in the user-interaction journal, as well as access the user-interaction journal to determine the content window the user is most likely to interact with.

In this type of embodiment, the content window that a user is most likely to interact with may be a content window that the user has not yet interacted with. For example, in some instances, a user at remote site may be the only user to have interacted with the content window. In this type of embodiments, the content window that the user in most likely to interact with can be determined based on user-interactions made at both computing device 208 and a computing device at remote site 225. Thus, it can be determined that a user at computing device 208 is most likely to interact with a content window that was most recently interacted with by a user at remote site 225, even if the user of computing device 208 has no record of interacting with the content window. Thus, the content window that was most recently interacted with by a user at remote site 225 can be presented at a location closest to the current position of a user at local site 205.

To accomplish this, when a presentation input is detected, the user-interaction journal can be accessed from disk 226 on cloud 220 and the recorded interactions can be used to determine the content window the user is most likely to interact with. For example, upon computing device 208 detecting a presentation input by a user at local site 205, computing device 208 can communicate with disk 226 to gather the user-interaction data stored in the user-interaction journal. Computing device 208 can then determine the content window that the user is most likely to interact with based on user-interactions detected at local site 205 and remote site 225.

Figure 10:
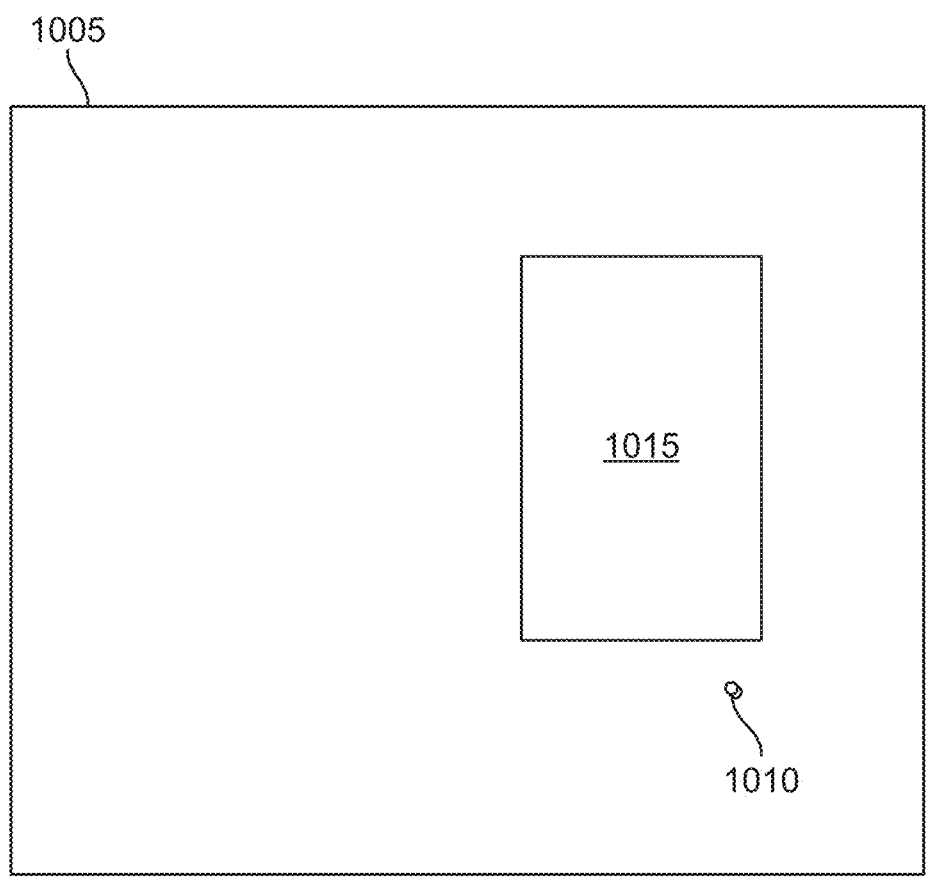
FIG. 10 illustrates an exemplary embodiment of presenting a content window on a display.

FIG. 10 illustrates an exemplary embodiment of presenting content window 1015 on display 1005. Point 1010 represents the determined current position of the user. As shown, content window 1015 is presented at a location on display 1005 that is near point 1010, and thus near the current position of the user. Accordingly, the user can easily access content window 1015.

Figure 11:
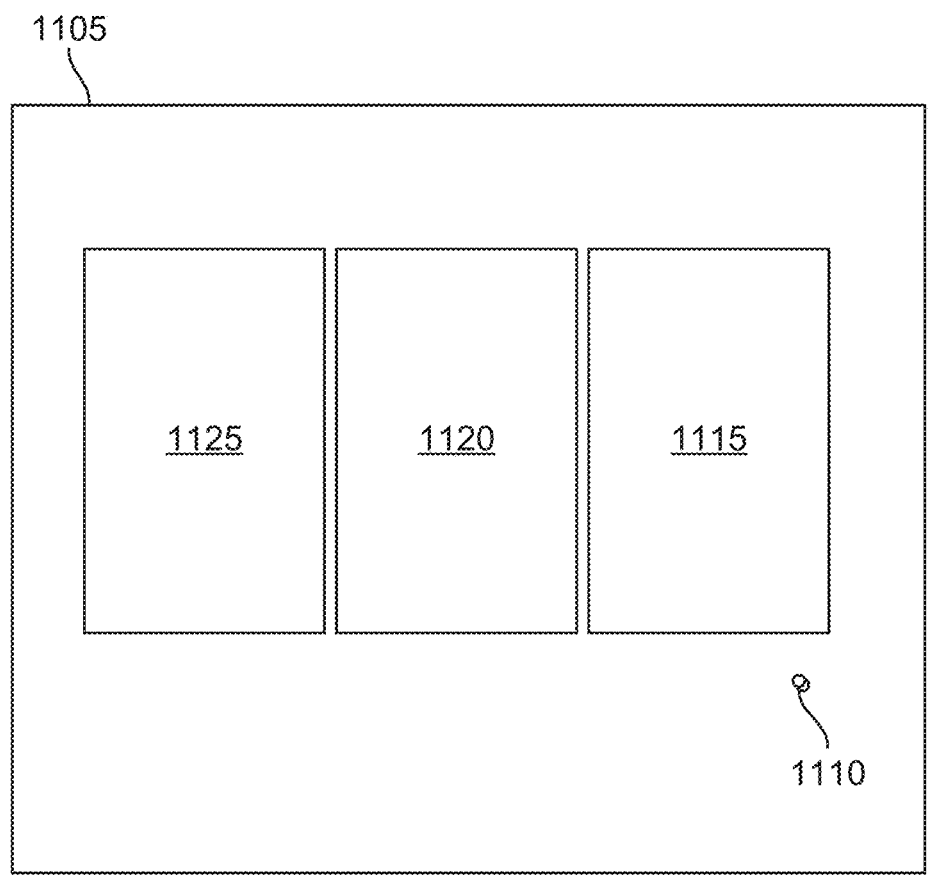
FIG. 11 illustrates an exemplary embodiment of presenting multiple content windows on a display.

FIG. 11 illustrates an exemplary embodiment of presenting multiple content windows on display 1105. Point 1110 represents the current position of the user. As shown, three content windows are displayed. Content window 1115 can displayed at a location on display 1105 closest to point 1110 and thus the current position of the user because content window 1115 has been determined to be the content window the user is most likely to interact with. Content window 1120 has been determined to be the content window the user is second most likely to interact with and is therefore displayed at a location of display 1105 farther to point 1110 than content window 1115 but closer to point 1110 than content window 1125. Content window 1125 has been determined to be the content window that the user is least likely to interact with and therefore is presented at a location on display 1105 farther from point 1110 than content window 1115 and content window 1120. The user can therefore be closest to the content windows that the user is most likely to interact with.

Figure 12:
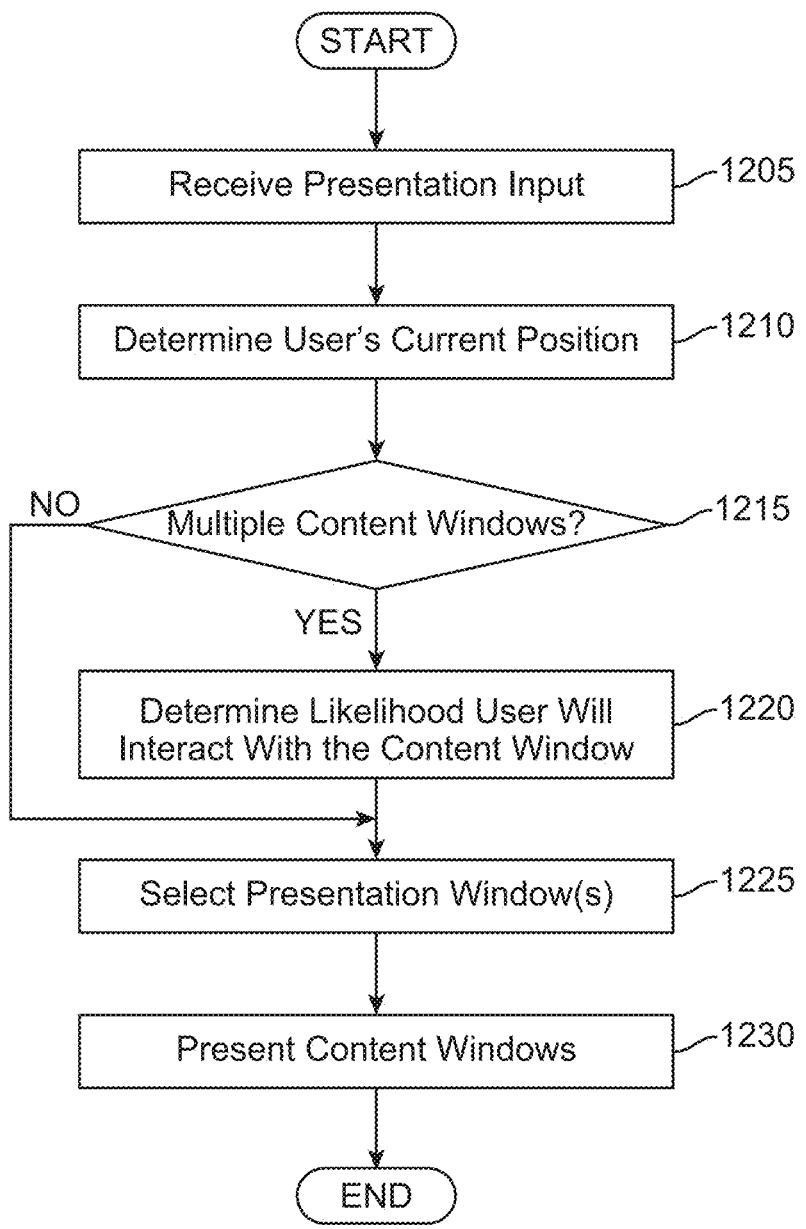
FIG. 12 illustrates an exemplary method embodiment of arranging the presentation locations of content windows.

FIG. 12 illustrates an exemplary method embodiment of arranging the presentation locations of content windows. As shown, the method begins at block 1205 where a presentation input is received. A presentation input can be an input requesting to present at least one content window. For example, a presentation input can be a input received at the collaboration portion of the display.

The method then continues to block 1210 where the current position of the user is determined. In some embodiments, the current position of the user can be determined based on the location of the presentation input. Alternatively, in some embodiments, the current position of the user can be based on a user-input history of detected user inputs.

The method then continues to block 1215 where it is determined if there are multiple content windows to be presented. If at block 1215 it is determined that there are not multiple content windows to be presented, i.e. there is only a single content window to present, the method continues to block 1225 where a presentation location is selected for the one content window. The presentation location can be selected based on the current position of the user determined at block 1210. For example, the presentation location can be selected to be near the current position of the user. The method then continues to block 1230 where the content window is presented at the presentation location and the method then ends.

Alternatively, if at block 1215 it is determined that there are multiple content windows to be displayed, the method continues to block 1220 where the likelihood that the user will interact with each content windows can be determined. In some embodiments, this determination can be based on a user-interaction journal describing detected user interactions with the content windows. For example, the likelihood that the user will interact with the content window can be based on when the user last interacted with the content window.

The method then continues to block 1225 where a presentation location is selected for each of the content windows. In some embodiments, the selection location of the content windows can be selected to result in the content windows that the user is most likely to interact with being presented near the user's current position, while the content windows the user is less likely to interact with can be presented farther from the user's current position.

The method then continues to block 1230 where the content windows are presented at their selected presentation location. The method then ends.

In some embodiments, the system can be optimized for use with large format displays through integration of technologies that can make the touch interface of the display redundant or not needed. For example, as illustrated in FIG. 9, the computing device can have one or more modules for voice recognition 918 or skeletal detection 922. Such technologies may make it so that a presenter or other meeting participant does not need to move their position to interact with the display. Instead a meeting participant can simply point at the object that he/she wishes to interact with. The skeletal tracking camera and software 922 can recognize that a user is pointing at the display in the general vicinity of a user interface feature presented on the display and make that feature active to receive subsequent inputs. In some embodiments, a voice recognition module 918 can interpret a meeting participant's speech and execute actions based thereon.

It will be realized that other technologies may also provide similar functionality, such as remote controls, or us of personal computing devices, etc. In some embodiments, these interaction mechanisms that avoid the need to actually touch the display can be combined with the various algorithms and heuristics set forth above to help optimize the meeting participant interactions with the system.

Further, it will be appreciated that such interaction mechanisms that avoid the need to actually touch the display can potentially blur the boundaries of which meeting participants should be considered a "presenter." However, in the context of this application for patent, a "presenter" is any meeting participant within the presenter zone 112. A foreground meeting participant is any meeting participant that is situated, generally in the middle of the room between the presenter zone the background meeting participants, and whose view of the display is substantially unobstructed. For example an exemplary foreground meeting participant zone is illustrated as 114 in FIG. 1. A background meeting participant is any meeting participant whose view of the display is substantially obstructed, for example, by foreground meeting participants. For example an exemplary background meeting participant zone is illustrated as 116 in FIG. 1. In some embodiments, a background meeting participant can even be out of the meeting room.

Classes of Interaction

Returning to the discussion of FIG. 7, in some embodiments, system 210 can be configured to manage multiple classes of participant interaction with a video-conference. Classes of participant interaction can refer to the possibility that meeting participants can be interacting with the video-conference from various meeting participant zones and/or using various personal computing devices, audio output devices and/or audio capturing devices. For example, in reference to FIG. 1, meeting participants located in presentation area 112 or foreground meeting participant zone 114, which are close to screen 203, may be interacting with the video conference via screen 203, whereas meeting participants located in background meeting participant zone 116, which is farther from screen 203, may be interacting with the video conference using a personal computing device in network communication with computing device 208 and/or via screen 203.

Managing the various classes of participant interaction can include varying presentation of the video conference content to best accommodate the various classes of participant interaction being used during the video conference. This can include both video and audio content. For example, if there are meeting participants interacting with the video-conference via screen 203 that are located in background meeting participant zone 110, these meeting participants may not be able to easily view or hear the video and audio content presented. Thus, to best accommodate this class of participant interaction, the size of the video content presented on screen 203 can be increased and/or the volume of the audio content can be increased so that the video conference can be easily viewed and heard by all meeting participants, regardless of location.

Alternatively, if the meeting participants located in background meeting participant zone 110 are also interacting via a personal computing device that mirrors screen 203, increasing the size of the objects presented on screen 203 may not be necessary because the meeting participants can easily view the screen on their personal computing device.

Returning to the discussion of FIG. 9, in some embodiments, computing device 208 can include class interaction module 940 configured to manage various classes of participant interaction. Class interaction module 940 can be configured to identify the active classes of participant interaction and vary presentation of video and audio content to best accommodate the various classes of participant interaction.

Identifying the active classes of participant interaction can include identifying the location of meeting participants, such as the meeting participant zone(s) where the meeting participants are located, as well as identifying any computing devices the meeting participants are using to interact with the video conference. For example, meeting participants may be interacting with the video conference via screen 203 as well as a personal computing device such as a smartphone, laptop, tablet PC, etc.

Further, in some embodiments, identifying the active classes of participant interaction can include identifying audio output devices and/or audio capturing devices used by meeting participants to interact with the video-conference. For example, meeting participants may be using headphones and/or a microphone to interact with the video-conference.

In some embodiments, class interaction module 940 can identify the active classes of interaction directly from the meeting participants. For example, class interaction module 940 can be configured to present an interaction interface that prompts the meeting participants to enter their location, such as the meeting participant zone, seat, table, etc., from which the meeting participant is interacting with the video conference. Further, the interaction interface can prompt the meeting participants to enter any computing devices, audio output devices and/or audio capturing device used by the meeting participants.

Alternatively, in some embodiments, class interaction module 940 can be configured to identify the location of the meeting participants based on video and/or audio data gathered from the meeting participants. For example, as described with regards to face detection module 916, voice recognition module 918, skeletal detection module 922 and directional audio module 924, video and audio data received by computing device 208 can be used to identify the various meeting participants as well as their locations. Class interaction module 940 can communicate with modules 916, 918, 922 and 924 to identify the location of the meeting participants.

Further, in some embodiments, this same technology can be used to identify any personal computing devices, audio output devices and/or audio capturing devices being used by the meeting participants. For example, video and audio data gathered can be used to identify if a meeting participant is using a personal computing device, speaking into an audio capturing device such as a microphone and/or using a audio output device such as headphones.

In some embodiments, class interaction module 940 can be configured to identify the active classes of participant interaction from personal computing devices in network communication with computing device 208. For example, meeting participants can be using personal computing devices such as smartphones, tablets, etc., to interact with the video-conference by connecting the personal computing devices to computing device 208. Class interaction module 940 can be configured to gather data from the personal computing devices, such as the type of personal computing devices, capabilities of the personal computing devices, audio output devices and/or audio capturing devices being used along with the personal computing devices, etc.

Further, in some embodiments, the personal computing devices can include a global positioning system (GPS) that can identify the location of the personal computing device. The personal computing devices can transmit this location data to computing device 208, which can then be used by class interaction module 940 to identify the location of the personal computing device and/or a meeting participant associated with the personal computing device.

In some embodiments, class interaction module 940 can identify the active classes of participant interaction using a combination of the methods described above. For example, class interaction module 940 can identify the active classes of participant interaction based on date received from the meeting participants via an interaction interface, as well as audio and video data gathered by computing device 208.

Upon identifying the active classes of participant interaction, class interaction module 940 can be configured to vary presentation of video and audio content to best accommodate the various classes of participant interaction. For example, in some embodiments, class interaction module 940 can be configured to vary the presentation of the video and audio content based on the location of the meeting participants. For example, if there are meeting participants located in background meeting participant zone 110, class interaction module 940 can present video content on screen 203 in a larger format than if all meeting participants are located near screen 203, for example in presenter zone 112 and/or foreground meeting participant zone 114. Video content can include text and/or images, video, etc. presented on screen 203. Thus video content can be presented in a larger format to accommodate meeting participants that are located father from screen 203, whereas video content can be presented in a regular or smaller format when all meeting participants are located closer to screen 203, resulting in additional usable screen space.

Additionally, in some embodiments, class interaction module 940 can be configured to present audio content at a higher volume when meeting participants are located at a location farther from screen 203 than when meeting participants are located at a location closer to screen 203. For example, class interaction module 940 can present the audio content at a higher volume when meeting participants are located in background meeting participant zone 110 than when meeting participants are located in presenter zone 112 and/or foreground meeting participant zone 114.

Further, in some embodiments, class interaction module 940 can vary the sensitivity of audio capturing devices based on the location of the meeting participants. For example, the sensitivity level of audio capturing devices, such as microphones, can be set to a higher sensitivity level when meeting participants are located farther from screen 203, such as in background meeting participant zone 110, than when meeting participants are located closer to screen 203, such as in presented zone 112 and/or foreground meeting participant zone 114. Thus, the audio capturing devices can be automatically adjusted to best capture audio input from the meeting participants based on the location of the meeting participant.

In some embodiments, class interaction module 940 can vary presentation of the video and audio content, as well as the sensitivity level of audio capturing devices, based on the location of the meeting participant located farthest from screen 203. For example, the volume of the audio content can be adjusted to accommodate the meeting participant(s) located farthest from screen 203. Thus the volume can be presented at a louder volume if only one meeting participant is located in background meeting participant zone 110, even if all the other meeting participants are located in foreground meeting participant zone 114.

Alternatively, in some embodiments, class interaction module 940 can vary presentation of the video and audio content and the sensitivity level of audio capturing devices, based on the location of the majority of the meeting participants. For example, class interaction module 940 can present the video and audio content to best accommodate meeting participants located in presenter zone 112 and foreground meeting participant zone 114, even if one meeting participant is located in background meeting participant zone 110.

In some embodiments, class interaction module 940 can be configured to vary presentation of video and audio content based on computing devices, audio output devices and/or audio capturing devices used by the meeting participants. For example, if meeting participants located farthest from screen 203, such as in background meeting participant zone 110, are using audio output devices such as headphones, class interaction module 940 can vary presentation of the audio content to accommodate meeting participants located closer to screen 203, such as in foreground meeting participant zone 114 and/or presenter zone 112, rather than to accommodate the meeting participants in background meeting participant zone 110.

Likewise, class interaction module 940 can be configured to vary the presentation of video content based on the computing devices being used by the meeting participants. For example, if the meeting participants located farthest from screen 203, such as in background meeting participant zone 110, are using computing devices that minor or partially minor display 203, class interaction module 940 can vary presentation of video content to accommodate the meeting participants in foreground meeting participant zone 114 and/or presentation zone 112, rather than the meeting participants in background meeting participant zone 110.

Further, class interaction module 940 can be configured to vary the sensitivity of audio input devices in direct connection with computing device 208, such as microphone 118 in FIG. 3, based on any personal audio input devices used by the meeting participants. For example, if meeting participants located in background meeting participant zone 110 are using a personal audio input devices, such as microphones video-conference, class interaction module 940 can be configured to set the sensitivity level of audio input devices to accommodate meeting participants located in foreground meeting participant zone 114 and/or presenter zone 112.

In some embodiments, class interaction module 940 can be configured to present different video content on display 203 than on a display of the personal computing devices. A personal computing device, such as a smartphone, may have a small display making it difficult for a meeting participant to view the video content presented on the display of the personal computing device. In these types of situations, it may be beneficial to minimize or filter the video content presented on the display of the personal computing device to avoid cluttering the smaller display. Video content not presented on the display of the personal computing device can be presented on display 203 so that the video content is still provided to the meeting participant.

In some embodiments, class interaction module 940 can be configured to select which video content to present on the display of the personal computing device based on the type of video content. For example, predetermined types of video content, such as command windows, meeting participant info, etc., can always be presented on only display 203, whereas video content such as changes to the interactive whiteboard can be presented on both display 203 as well as the display of the personal computing devices in communication with computing device 208.

Alternatively, in some embodiments, class interaction module 940 can be configured to select which video content is presented on the display of the personal computing device based on the size of the display of the personal computing device. For example, personal computing devices with larger displays, such as laptops and tablet PCs, can provide greater room to provide video content than personal computing devices with smaller displays, such as smart phones. Accordingly, more video content can be presented on a personal computing device with a larger display than a personal computing device with a smaller display, without cluttering the display. Class interaction module 940 can thus vary the video content presented on a personal computing device based on the size the display of the personal computing device such that personal computing devices with larger displays present more video content than personal computing devices with smaller displays.

Video content not presented on the display of the personal computing devices can be presented on display 203. For example, the video content can be presented in a larger format to ensure that all meeting participants can view the video content that is not available on their personal computing device.

In some embodiments, content can be displayed on computing devices based on where a meeting participant having a personal computing device is located in the room. If the meeting participant is a foreground-meeting participant, the system can be configured to only display extra content, or a notes application, rather than reproducing the content on the display 203 because a foreground-meeting participant presumably has a substantially unobstructed view of the display 203. If a meeting participant is a background-meeting participant, the system can mirror at least some aspects of the content on display 203 because a background-meeting participant presumably has an obstructed view of the display 203.

In some embodiments, the meeting room 100 can be configured in a two-zone configuration (presenter and participant) wherein camera 110 is used to record a presenter standing in front of the display 102 such as when giving a minimally interactive or non-interactive presentation or when the system is being used for a more traditional videoconference. In such embodiments, the system is configured to treat all participants as being in the same zone.

Figure 13:
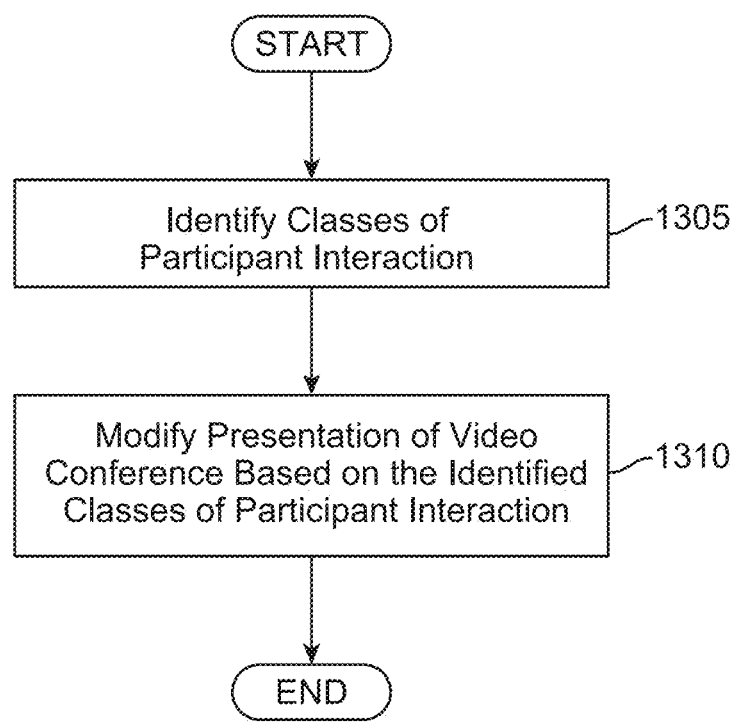
FIG. 13 illustrates an exemplary method embodiment of managing multiple classes of participant interaction.

FIG. 13 illustrates an exemplary method embodiment of managing multiple classes of participant interaction. As shown the method begins at block 1305 where the active classes of participant interaction are identified. This can include identifying the location of the meeting participants as well as any computing device, audio output devices, and/or audio capturing devices used by the meeting participants.

The method then continues to block 1310 where presentation of the video-conference is modified based on the identified classes of participant interaction. For example, the size of video content and the volume of audio of content presented can be modified based on the active classes of participant interaction. For example, the size of video content can be presented increased or decreased based on the location of the meeting participants to ensure that the meeting participants can easily view the video content form their location.

Likewise, the volume of audio content can be increased or decreased based on the location of the meeting participants. For example, the volume of the audio content can be set to ensure that meeting participants can easily hear the audio content from their location.

In some embodiments, the sensitivity level of audio capturing devices, such as a microphone, can be set based on the location of the meeting participants. For example, the sensitivity level of the audio capturing device can be set to ensure that the audio capturing devices can capture audio from the meeting participants regardless of location. The meeting participants can thus be assured that they can easily see and hear the video-conference, as well as interact with the other meeting participants, from their location. The method then ends.

Personal Computing Device Interactions

As introduced above, workstation 208 can be configured to interact with one or more personal computing devices 209, wherein the personal computing devices can be a client of one of the collaborative system controller 214. In some embodiments, personal computing devices can be configured with software to allow the devices to act as a limited client of the collaborative system servers within cloud 220. In some embodiments the personal computing devices are limited to only being a client of one of the servers within cloud 220 at a time to account for limited display area on devices 209.

In some embodiments personal computing devices 209 can connect to workstation 208 via a network that only extends throughout a meeting room, such that any device attempting to connect to the network must be in the meeting room. In such embodiments, any device attempting to connect to the network can be granted access based on the fact that the personal device must be in the meeting room and presumptively anyone in the meeting room is a part of the meeting. The presence of a device in the meeting room can also be a mechanism for knowing that a meeting participant is present.

Figure 14:
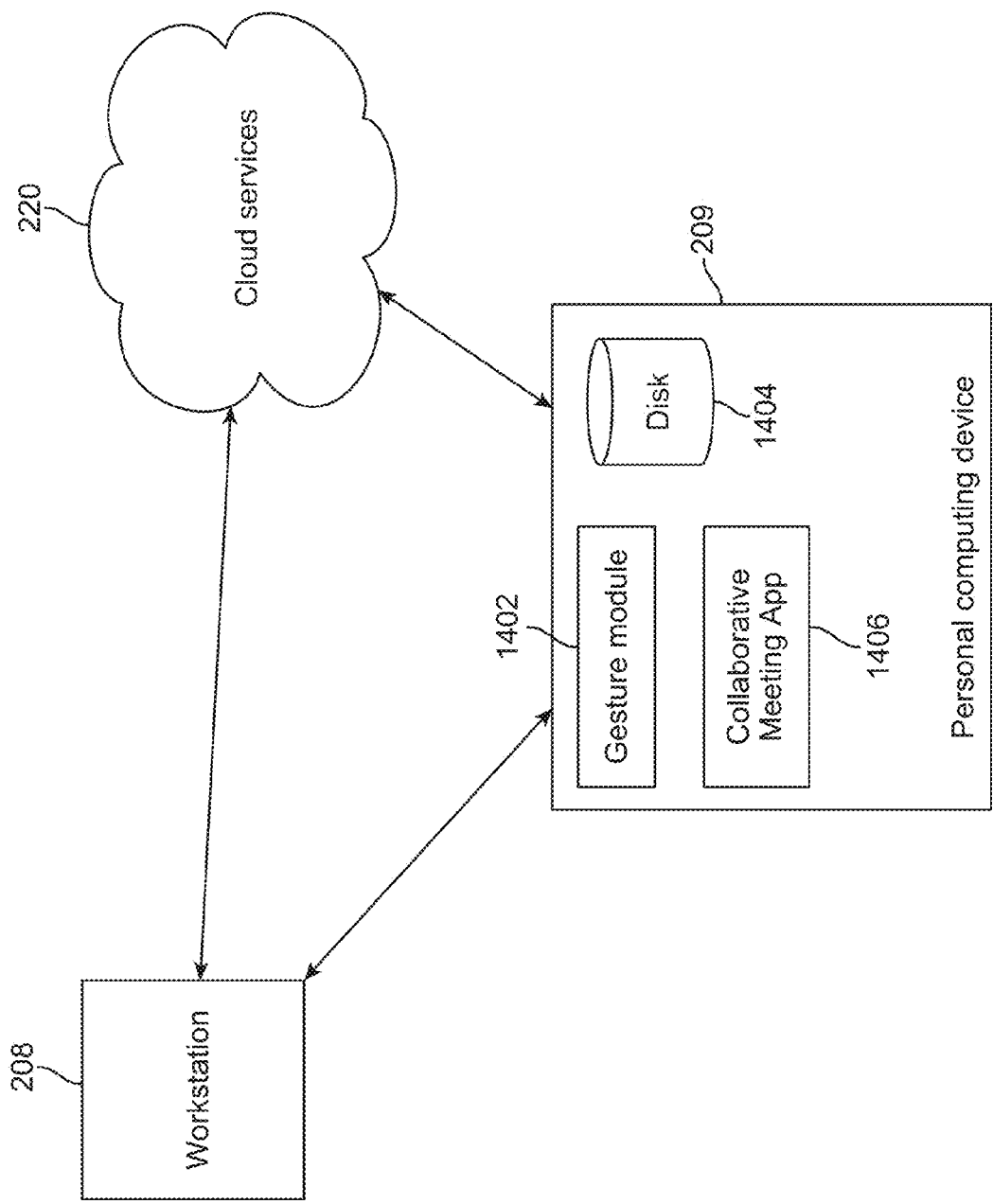
FIG. 14 illustrates a personal computing device configured to run an application that is compatible with the collaborative conferencing system.

In some embodiments, and as illustrated in FIG. 14, the personal computing device 209 is configured to run an application 1406 that is compatible with the collaborative conferencing system described herein. The application 1406 can include a login module configured to detect the presence of a workstation 208 having a collaborative system controller 214 running thereon, and transmit login credentials to the workstation 208. In some embodiments the workstation 208 can pass the credentials to the cloud 220 for authentication. In some embodiments of the login, such as when a user is actually present in the meeting room, and thus can connect to workstation 208, authentication is merely used to verify the identity of a meeting participant which can be further used to admit access to a network resource associated with the meeting and/or personal network resources otherwise available to the user. In some embodiments, meeting participants can remotely connect (without being in the meeting room) to a meeting by connecting to the collaborative system server 224 through a networked connection. In such embodiments, a user can need to be on an invite list, or request permission to attend a meeting, which will need to be granted by a presenter.

Figure 15:
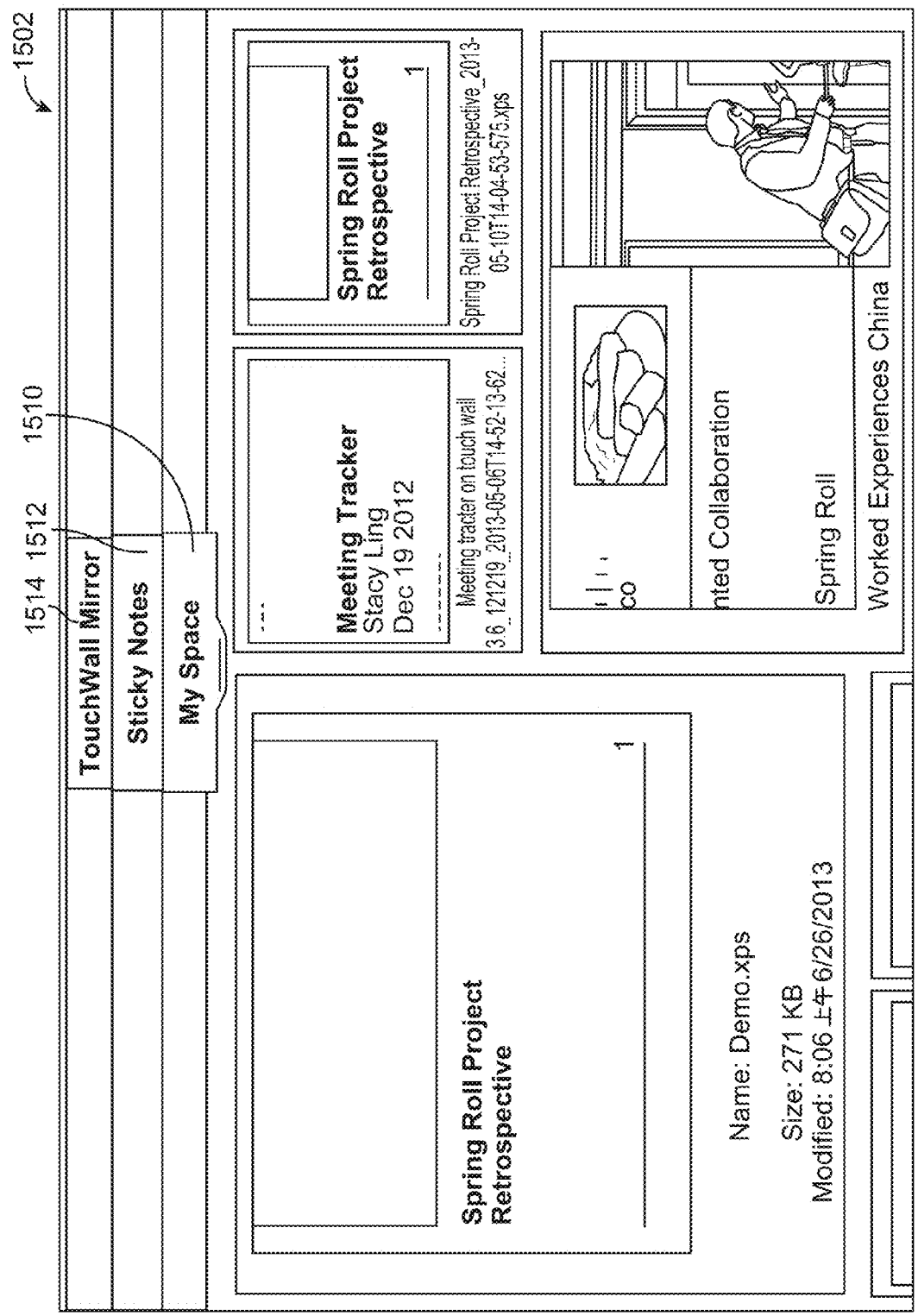
FIG. 15 illustrates an exemplary display of the application running on a personal computing device.

Once the application 1406 on the personal computing device is launched 209, a user can have access to a screen showing contents to one or more content items that are accessible to the user, a content creation screen, and a mirrored display of content displayed on the collaborative portion 140 of display 102. For example FIG. 15 illustrates an exemplary display of the application 1406 running on a personal computing device 209. The application 1406 can have an interface 1502 including tabs for accessing different screens within the application 1406. For example, interface 1502 includes a "my space" screen 1510, a content creation screen 1512, and a collaborative screen display 1514.

FIG. 15 illustrates in particular, the "my space" screen 1510 which can display a collection of content items which a user has access to. In some embodiments, this can include file structure interfaces, whether on a server, or other computing device, or can be a merged display of content in directories. The directories that can be accessed can include personal or shared directories that the user has access to irrespective of the collaborative meeting, and a directory that is specific to the meeting.

Figure 16A:
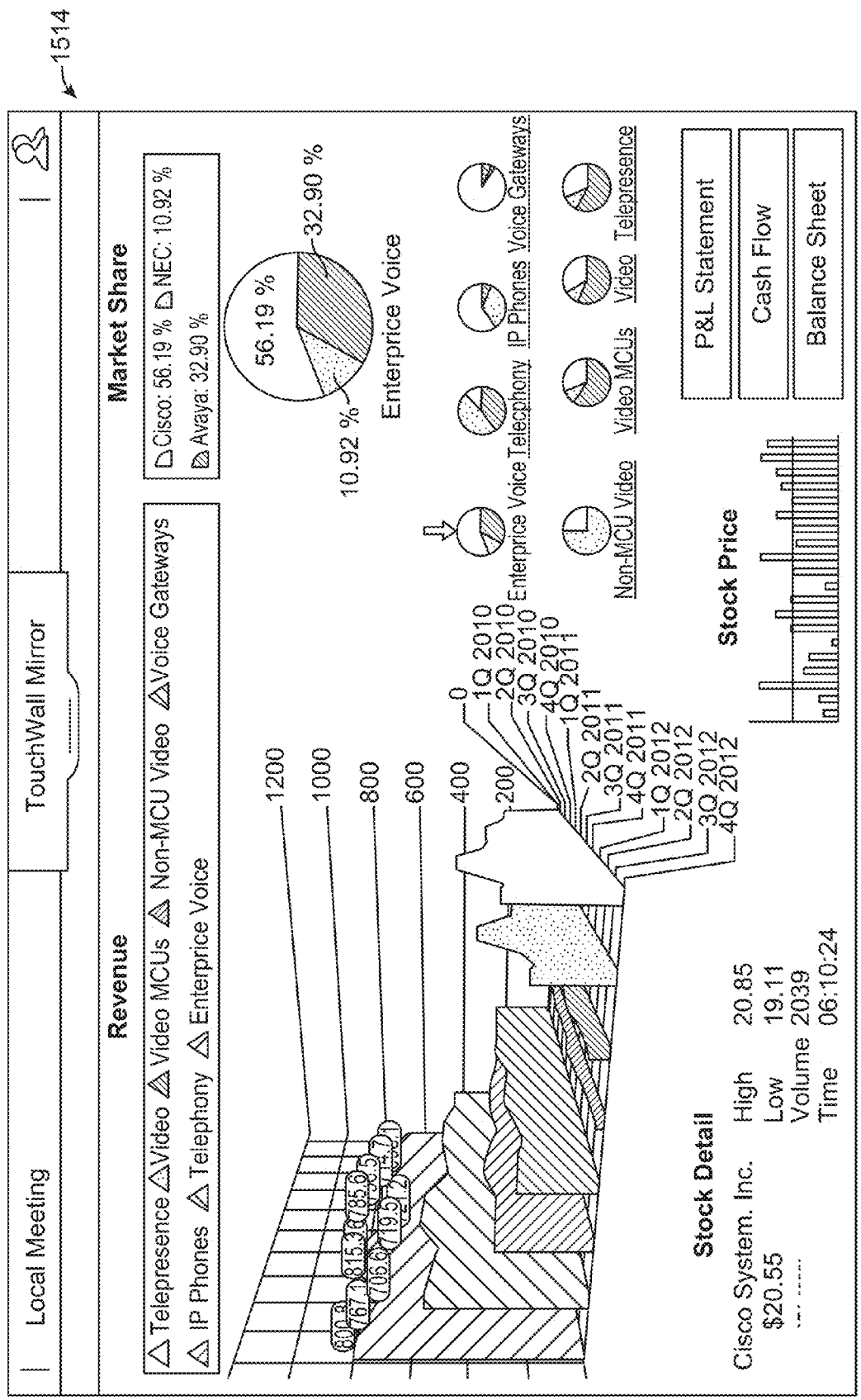
FIGS. 16A and 16B illustrate exemplary embodiments of the collaborative screen display.

FIG. 16A illustrates in particular, the collaborative screen display 1510 which can display a view of the collaborative portion 140 of display 102. In some embodiments, the screen 1514 on a personal computing device will always display a view as if it were in a remote location from the presenter interacting with the screen since the personal computing device user will never be looking at a screen that is being directly interacted with by a presenter. In some embodiments, it is not necessary to display features useful in indicating where a remote presenter is interacting with the screen since the personal computing device is not enabled, in some embodiments, for accepting direct inputs on the collaborative portion 140 of display. Therefore, it is not necessary to display a ghosted menu, or to display a hand or pen at a point of drawing. Instead, it is sufficient to merely display the actual displayed content.

Figure 16B:
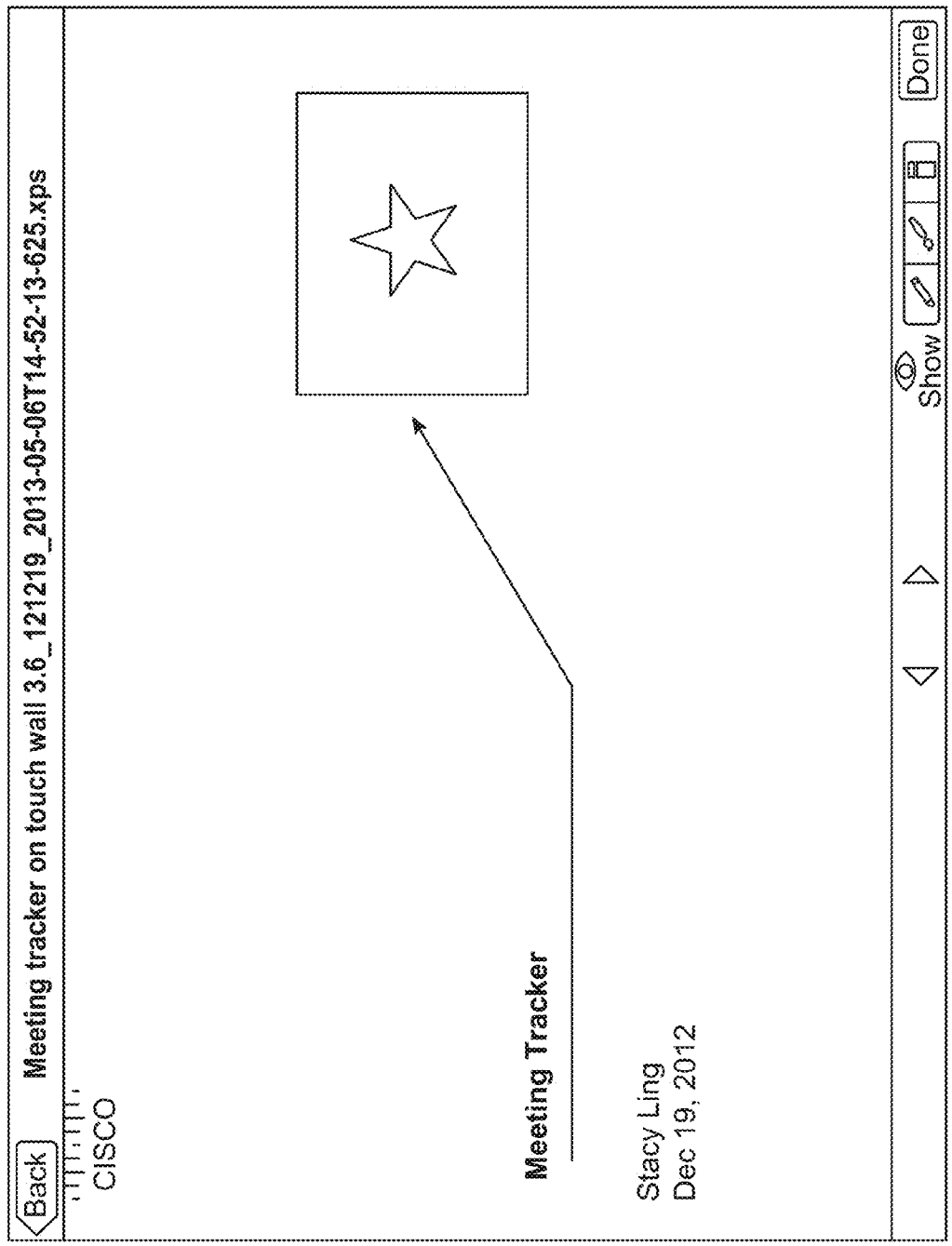

For example, FIG. 16B illustrates the collaborative screen display 1510 showing a presentation that has been edited by a presenter on the collaborative portion 140 of the display 102. In FIG. 16B, the content from the collaborative portion 140 of the display 102 but the drawing instruments such an image of a marker or hand is not displayed.

Figure 17:
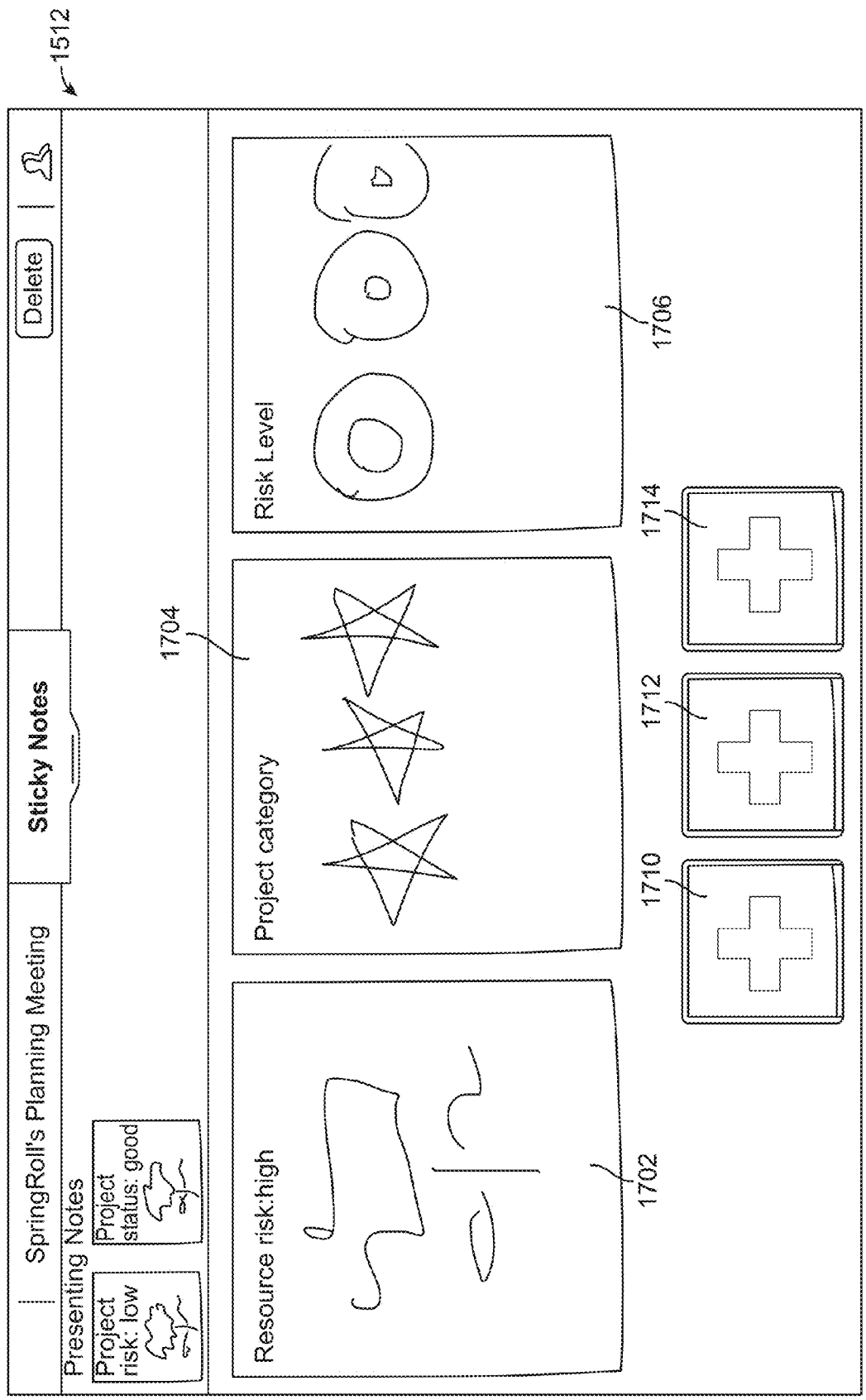
FIG. 17 illustrates an exemplary embodiment of the content creation screen used to create documents that can be shared.

FIG. 17 illustrates in particular, the content creation screen 1512 which can be used to create documents that can be shared, as will be described in more detail below, with the collaborative meeting system described herein. In the exemplary embodiments illustrated, digital sticky notes can be created such as notes 1702, 1704, and 1706. A note can be created by selecting one of the note creation icons 1710, 1712, and 1714. Each of the note creation icons are color coded to create a note of the same color. For example note creation icon 1710 can be yellow and be used to create a yellow sticky note. Note creation icon 1712 can be blue, and note creation icon 1714 can be pink, etc.

Figure 18:
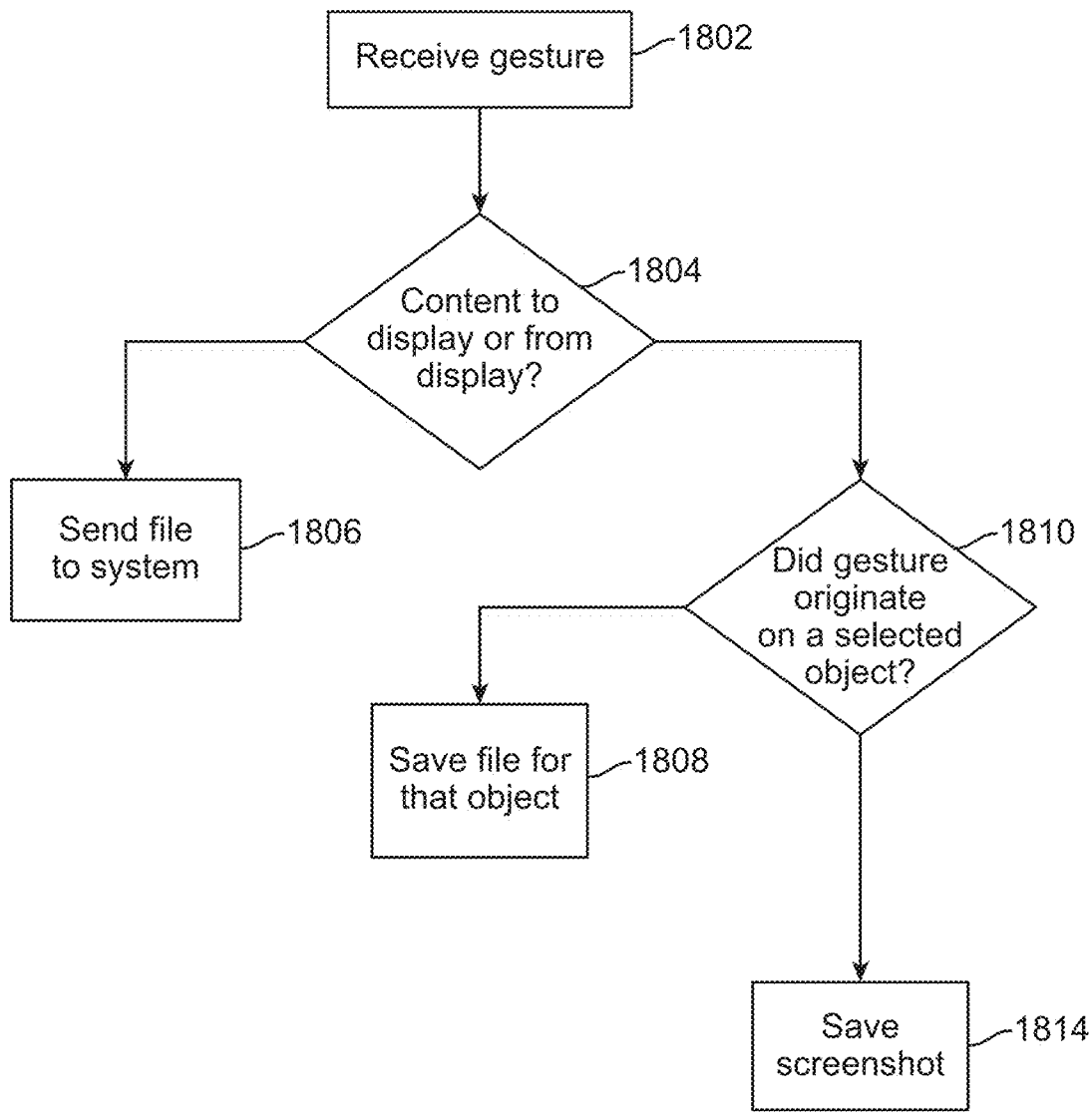
FIG. 18 an exemplary method embodiment of uploading or downloading content from the collaborative display.
Figure 19:
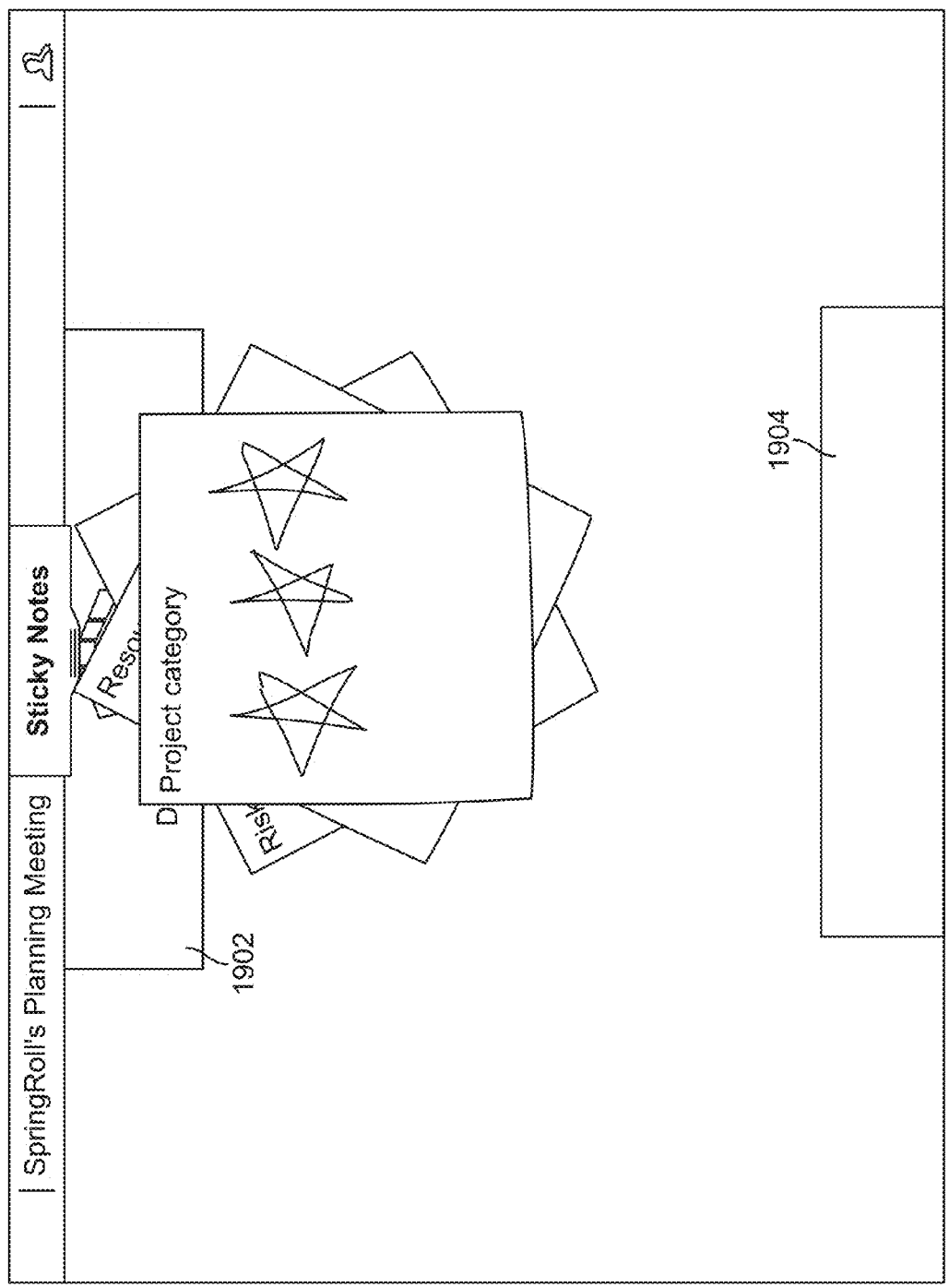
FIG. 19 illustrates an exemplary user interface embodiment for sharing content to the display screen or downloading content from the display screen.

In some embodiments the application 1406 can be used to share content to the collaborative portion of the display, or to copy a displayed item or screenshot. FIG. 18 illustrates an exemplary method of uploading or downloading content from the collaborative display. While any screen can be used to upload or download content from the collaborative display, FIG. 19 illustrates an exemplary user interface embodiment for sharing content to the display screen or downloading content from the display screen.

The method illustrated in FIG. 18 begins when a user input is received in the graphical user interface of the portable computing device 209. In some embodiments the input is a gesture received as a touch input. Referring back to FIG. 14 the personal computing device 209 includes a gesture module 1402 for receiving and interpreting touch input received into the touch screen on the portable computing device 209. In some embodiments, such touch input is a touch, hold, and drag collection of gestures.

In step 1802 the portable computing device receives the touch, hold, drag collection of gestures, which indicates that a user is attempting to share or receive content to/from the collaborative portion of the display. The touch and hold portion of the series of gestures can be used to select content, and the drag can be used to drag the content to an area of the graphical user interface of the portable computing device that is used to share content, or a portion of the graphical user interface of the portable computing device that is used to receive content. These portions are illustrated as 1902 for sharing, and 1904 for receiving in FIG. 19.

At step 1804 the method determines whether the user is attempting to share or receive content from the collaborative portion of the display. In some embodiments such determination 1804 is made by determining whether the user has selected content in the collaborative content display 1510 which only displays content displayed on the collaborative portion 140 of display 102, or whether the user has selected content in view 1510 or 1512, both of which include content accessible to the portable computing device that might not be currently displayed on the collaborative portion of the display. In such embodiments wherein it is clear from the UI screen being displayed what the user's intent is, only a proper "drop" area 1902, 1904 can be displayed, i.e., only the drop area needed for the action matching the user's intent need be displayed.

In some embodiments, the method can determine whether a user wishes to share or receive content based on the termination of the drag gesture. For example, as illustrated in FIG. 19, sharing drop area 1902 at the top of the display of the portable computing device can represent a drop area for images, files, and content in general to be "dropped" (the click, hold, drag gesture terminates) in this area. In contrast receiving drop area 1904 can be used to receive files being selected from the collaborative meeting system and "dropped" in this area.

If the system determines that a user is trying to share a file 1804 with the collaborative system, the portable computing device sends 1806 the file to computing device 208, wherein a prompt can appear on the screen to allow at least one of the presenters to decide whether to display the content. In some embodiments, the content can be saved in a directory stored in cloud 220.

If the system determines 1804 that the user is attempting to receive an object, the app 1406 must determine 1810 what specific content the user desires to receive. For example decision point 1810 determines whether the user intends to capture a screen shot of the currently displayed screen content, or receive a copy of a file displayed on the display screen. This determination can be performed by a heuristic that assumes that user is attempting to download a specific file if the user has made a selection action (for example, touch and hold) on a image representing a specific file, and the file is downloaded 1808 into memory 1404 at the personal computing device. However, if the user has not performed a selection action directly on a file, the heuristic assumes that the user just desires a screen shot, and at step 1814 downloads the screen shot on memory 1404 at the personal computing device 209. In some embodiments, content that is downloaded from the personal computing device can be downloaded directly to a personal directory in the cloud for later retrieval from a variety of devices and not just the device that downloaded the content.

In some embodiments, the collaborative meeting app 1406 on personal computing device 209 can be configured to provide an interface for a user of the mobile device to take notes about the meeting. The notes can be time stamped to correspond to when in the meeting the notes apply. For example, if a user were to watch a recording (such as available through the online meeting service WebEx™), the user could be presented with their notes that correspond to the running time in the meeting.

In some embodiments notes taken by a user could be saved in cloud 220 such as on the disk 226 or other storage service. In some embodiments, the users notes can be made available to all meeting participants or further observers of the meeting watching a recording of the meeting.

FIG. 20A, and FIG. 20B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 20A illustrates a conventional system bus computing system architecture 2000 wherein the components of the system are in electrical communication with each other using a bus 2005. Exemplary system 2000 includes a processing unit (CPU or processor) 2010 and a system bus 2005 that couples various system components including the system memory 2015, such as read only memory (ROM) 2020 and random access memory (RAM) 2025, to the processor 2010. The system 2000 can include a cache of high-speed memory connected directly with, in close proximity to, or integrated as part of the processor 2010. The system 2000 can copy data from the memory 2015 and/or the storage device 2030 to the cache 2012 for quick access by the processor 2010. In this way, the cache can provide a performance boost that avoids processor 2010 delays while waiting for data. These and other modules can control or be configured to control the processor 2010 to perform various actions. Other system memory 2015 may be available for use as well. The memory 2015 can include multiple different types of memory with different performance characteristics. The processor 2010 can include any general purpose processor and a hardware module or software module, such as module 1 2032, module 2 2034, and module 3 2036 stored in storage device 2030, configured to control the processor 2010 as well as a special-purpose processor where software instructions are incorporated into the actual processor design. The processor 2010 may essentially be a completely self-contained computing system, containing multiple cores or processors, a bus, memory controller, cache, etc. A multi-core processor may be symmetric or asymmetric.

To enable user interaction with the computing device 2000, an input device 2045 can represent any number of input mechanisms, such as a microphone for speech, a touch-sensitive screen for gesture or graphical input, keyboard, mouse, motion input, speech and so forth. An output device 2035 can also be one or more of a number of output mechanisms known to those of skill in the art. In some instances, multimodal systems can enable a user to provide multiple types of input to communicate with the computing device 2000. The communications interface 2040 can generally govern and manage the user input and system output. There is no restriction on operating on any particular hardware arrangement and therefore the basic features here may easily be substituted for improved hardware or firmware arrangements as they are developed.

Storage device 2030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2025, read only memory (ROM) 2020, and hybrids thereof.

The storage device 830 can include software modules 2032, 2034, 2036 for controlling the processor 2010. Other hardware or software modules are contemplated. The storage device 2030 can be connected to the system bus 2005. In one aspect, a hardware module that performs a particular function can include the software component stored in a computer-readable medium in connection with the necessary hardware components, such as the processor 2010, bus 2005, display 2035, and so forth, to carry out the function.

FIG. 20B illustrates a computer system 2050 having a chipset architecture that can be used in executing the described method and generating and displaying a graphical user interface (GUI). Computer system 2050 is an example of computer hardware, software, and firmware that can be used to implement the disclosed technology. System 2050 can include a processor 2055, representative of any number of physically and/or logically distinct resources capable of executing software, firmware, and hardware configured to perform identified computations. Processor 2055 can communicate with a chipset 2060 that can control input to and output from processor 2055. In this example, chipset 2060 outputs information to output 2065, such as a display, and can read and write information to storage device 2070, which can include magnetic media, and solid state media, for example. Chipset 2060 can also read data from and write data to RAM 2075. A bridge 2080 for interfacing with a variety of user interface components 2085 can be provided for interfacing with chipset 2060. Such user interface components 2085 can include a keyboard, a microphone, touch detection and processing circuitry, a pointing device, such as a mouse, and so on. In general, inputs to system 2050 can come from any of a variety of sources, machine generated and/or human generated.

Chipset 2060 can also interface with one or more communication interfaces 2090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 2055 analyzing data stored in storage 2070 or 2075. Further, the machine can receive inputs from a user via user interface components 2085 and execute appropriate functions, such as browsing functions by interpreting these inputs using processor 2055.

It can be appreciated that exemplary systems 2000 and 2050 can have more than one processor 2010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   capturing first video data in a room using at least a first camera and second video data using at least a second camera, the room corresponding to at least a first zone and a second zone, the first zone being located between the second zone and a primary screen of the room, the first camera capable of capturing at least a substantial portion of a standing user located in the first zone, the second camera capable of capturing a user located in the second zone;
   analyzing, by a processor, the first video data and the second video data to determine at least a first location of a first meeting participant of a video-conference and a second location of a second meeting participant of the video-conference;
   determining, by the processor, first characteristics of at least the first meeting participant and second characteristics of at least the second meeting participant;
   defining, by the processor, a first participant interaction class based on the first characteristics of at least the first meeting participant, and a second participant interaction class based on the second characteristics of at least the second meeting participant, wherein the first participant interaction class is associated with the first location of the first meeting participant and the second participant interaction class is associated with the second location of the second meeting participant; and
   varying, by the processor, presentation of the video-conference based on at least one of the first participant interaction class or the second participant interaction class.

2. The method of claim 1, wherein a first distance measured from the first location to the primary screen displaying the video conference is greater than a second distance measured from the second location to the primary screen displaying the video conference.

3. The method of claim 2, wherein varying presentation of the video-conference is based on the first participant interaction class, and includes at least one of:
   presenting, on the primary screen, video content at a size selected based on the first distance, the size selected to enable a meeting participant located at the first location to view the video content;
   presenting, on an audio output device, audio content at a volume selected based on the first distance, the volume selected to enable a meeting participant located at the first location to hear the audio content; or
   setting, an audio capturing device, to a sensitivity level selected based on the first distance, the sensitivity level selected to enable the audio capturing device to capture audio output by a meeting participant located at the first location.

4. The method of claim 2, wherein varying presentation of the video-conference is based on the second participant interaction class when a meeting participant located at the first location is using a mobile computing device to interact with the video-conference.

5. The method of claim 2, further comprising:
   determining a first number of meeting participants located at the first location; and
   determining a second number of meeting participants located at the second location, wherein varying presentation of the video-conference is based on the second participant interaction class when the second number of meeting participants is greater than the first number of meeting participants.

6. The method of claim 5, wherein varying presentation of the video-conference based on the second participant interaction class includes at least one of:
   presenting, on the primary screen, video content at a size selected based on the second distance, the size selected to enable a meeting participant located at the second location to view the video content;
   presenting, on an audio output device, audio content at a volume selected based on the second distance, the volume selected to enable a meeting participant located at the second location to hear the audio content; or
   setting, an audio capturing device, to a sensitivity level selected based on the first distance, the sensitivity level selected to enable the audio capturing device to capture audio output by a meeting participant located at the first location.

7. The method of claim 1, wherein:
   the first participant interaction class is associated with a mobile computing device used by at least one meeting participant located at the first location, and
   varying presentation of the video-conference includes:
   selecting a subset of video content presented on the primary screen of the video-conference for presentation on the mobile computing device.

8. The method of claim 7, wherein the subset of video content presented on the primary screen of the video-conference that is presented on the mobile computing device is selected based on a screen size associated with the mobile computing device.

9. A system comprising:
   a processor; and
   a memory containing instructions that, when executed, cause the processor to:
   capture first video data in a room using at least a first camera and second video data using at least a second camera, the room corresponding to at least a first zone and a second zone, the first zone being located between the second zone and a primary screen of the room, the first camera capable of capturing at least a substantial portion of a standing user located in the first zone, the second camera capable of capturing a user located in the second zone;
   analyze the first video data and the second video data to determine at least a first location of a first meeting participant of a video-conference and a second location of a second meeting participant of the video-conference;
   determine first characteristics of at least the first meeting participant and second characteristics of at least the second meeting participant;
   identify a first participant interaction class based on the first characteristics of at least the first meeting participant, and a second participant interaction class based on the second characteristics of at least the second meeting participant, wherein the first participant interaction class is associated with the first location of the first meeting participant and the second participant interaction class is associated with the second location of the second meeting participant; and
   vary presentation of the video-conference based on at least one of the first participant interaction class or the second participant interaction class.

10. The system of claim 9, wherein a first distance measured from the first location to the primary screen displaying the video-conference is greater than a second distance measured from the second location to the primary screen displaying the video conference.

11. The system of claim 10, wherein varying presentation of the video-conference is based on the first participant interaction class, and includes at least one of:
  presenting, on the primary screen, video content at a size selected based on the first distance, the size selected to enable a meeting participant located at the first location to view the video content;
  presenting, on an audio output device, audio content at a volume selected based on the first distance, the volume selected to enable a meeting participant located at the first location to hear the audio content; or
  setting, an audio capturing device, to a sensitivity level selected based on the first distance, the sensitivity level selected to enable the audio capturing device to capture audio output by a meeting participant located at the first location.

12. The system of claim 10, wherein varying presentation of the video-conference is based on the second participant interaction class when a meeting participant located at the first location is using a mobile computing device to interact with the video-conference.

13. The system of claim 10, the instructions further causing the processor to:
  determine a first number of meeting participants located at the first location; and
  determine a second number of meeting participants located at the second location, wherein varying presentation of the video-conference is based on the second participant interaction class when the second number of meeting participants is greater than the first number of meeting participants.

14. The system of claim 13, wherein varying presentation of the video-conference based on the second participant interaction class includes at least one of:
  presenting, on the primary screen, video content at a size selected based on the second distance, the size selected to enable a meeting participant located at the second location to view the video content;
  presenting, on an audio output device, audio content at a volume selected based on the second distance, the volume selected to enable a meeting participant located at the second location to hear the audio content; or
  setting, an audio capturing device, to a sensitivity level selected based on the first distance, the sensitivity level selected to enable the audio capturing device to capture audio output by a meeting participant located at the first location.

15. A non-transitory computer-readable medium containing instructions that, when executed by a computing device, cause the computing device to:
  capture first video data in a room using at least a first camera and second video data using at least a second camera, the room corresponding to at least a first zone and a second zone, the first zone being located between the second zone and a primary screen of the room, the first camera capable of capturing at least a substantial portion of a standing user located in the first zone, the second camera capable of capturing a user located in the second zone;
  analyze the first video data and the second video data to determine at least a first location of a first meeting participant of a video-conference and a second location of a second meeting participant of the video-conference;
  determine first characteristics of at least the first meeting participant and second characteristics of at least the second meeting participant;
  identify a first participant interaction class based on first characteristics of at least the first meeting participant, and a second meeting participant interaction class based on second characteristics of at least the second meeting participant, wherein the first participant interaction class is associated with the first location of the first meeting participant and the second participant interaction class is associated with the second location of the second meeting participant; and
  vary presentation of the video-conference based on at least one of the first participant interaction class or the second participant interaction class.

16. The non-transitory computer-readable medium of claim 15, wherein a first distance measured from the first location to the primary screen displaying the video conference is greater than a second distance measured from the second location to the primary screen displaying the video conference.

17. The non-transitory computer-readable medium of claim 16, wherein varying presentation of the video-conference is based on the first participant interaction class, and includes at least one of:
  presenting, on the primary screen, video content at a size selected based on the first distance, the size selected to enable a meeting participant located at the first location to view the video content;
  presenting, on an audio output device, audio content at a volume selected based on the first distance, the volume selected to enable a meeting participant located at the first location to hear the audio content; or
  setting, an audio capturing device, to a sensitivity level selected based on the first distance, the sensitivity level selected to enable the audio capturing device to capture audio output by a meeting participant located at the first location.

18. The non-transitory computer-readable medium of claim 16, wherein varying presentation of the video-conference is based on the second participant interaction class when a meeting participant located at the first location is using a mobile computing device to interact with the video-conference.

19. The non-transitory computer-readable medium of claim 16, the instructions further causing the computing device to:
  determine a first number of meeting participants located at the first location; and
  determine a second number of meeting participants located at the second location, wherein varying presentation of the video-conference is based on the second participant interaction class when the second number of meeting participants is greater than the first number of meeting participants.

20. The non-transitory computer-readable medium of claim 19, wherein varying presentation of the video-conference based on the second participant interaction class includes at least one of:
  presenting, on the primary screen, video content at a size selected based on the second distance, the size selected to enable a meeting participant located at the second location to view the video content;
  presenting, on an audio output device, audio content at a volume selected based on the second distance, the volume selected to enable a meeting participant located at the second location to hear the audio content; or
  setting, an audio capturing device, to a sensitivity level selected based on the first distance, the sensitivity level selected to enable the audio capturing device to capture audio output by a meeting participant located at the first location.

* * * * *